(12) United States Patent
Guemmer

(10) Patent No.: US 8,591,176 B2
(45) Date of Patent: Nov. 26, 2013

(54) FLUID FLOW MACHINE WITH SIDEWALL BOUNDARY LAYER BARRIER

(75) Inventor: Volker Guemmer, Mahlow (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 866 days.

(21) Appl. No.: 12/612,419

(22) Filed: Nov. 4, 2009

(65) Prior Publication Data

US 2010/0143140 A1   Jun. 10, 2010

(30) Foreign Application Priority Data

Dec. 4, 2008 (DE) .......................... 10 2008 060 424

(51) Int. Cl.
*F01D 9/06* (2006.01)
*F01D 5/02* (2006.01)

(52) U.S. Cl.
USPC .................... 415/116; 415/208.2; 415/914

(58) Field of Classification Search
USPC ............ 415/58.4, 58.5, 58.6, 58.7, 59.1, 116, 415/117, 182.1, 208.1, 208.2, 914
See application file for complete search history.

(56) References Cited

U.S. PATENT DOCUMENTS

| | | | | |
|---|---|---|---|---|
| 2,735,612 A | * | 2/1956 | Hausmann ............... | 415/208.1 |
| 3,692,425 A | * | 9/1972 | Erwin ....................... | 415/181 |
| 4,420,288 A | * | 12/1983 | Bischoff .................... | 416/244 A |
| 5,382,135 A | * | 1/1995 | Green ........................ | 416/97 R |
| 6,283,713 B1 | | 9/2001 | Harvey et al. | |
| 6,561,761 B1 | | 5/2003 | Decker et al. | |
| 6,669,445 B2 | | 12/2003 | Staubach et al. | |
| 7,220,100 B2 | | 5/2007 | Lee et al. | |
| 7,249,933 B2 | * | 7/2007 | Lee et al. ................... | 416/97 R |
| 7,354,243 B2 | | 4/2008 | Harvey | |
| 7,364,404 B2 | * | 4/2008 | Guemmer ................... | 416/91 |
| 7,387,487 B2 | | 6/2008 | Guemmer | |
| 7,637,716 B2 | * | 12/2009 | Benton ....................... | 415/116 |
| 8,043,046 B2 | * | 10/2011 | Guemmer .................. | 415/115 |
| 8,105,037 B2 | * | 1/2012 | Grover et al. ............. | 416/193 A |
| 8,202,039 B2 | * | 6/2012 | Guemmer .................. | 415/55.5 |
| 8,303,258 B2 | | 11/2012 | Aubin | |

(Continued)

FOREIGN PATENT DOCUMENTS

| | | |
|---|---|---|
| DE | 69321261 | 5/1999 |
| DE | 19834647 | 2/2000 |

(Continued)

OTHER PUBLICATIONS

German Search Report dated Aug. 2, 2012 from counterpart application.

(Continued)

*Primary Examiner* — Edward Look
*Assistant Examiner* — Christopher R Legendre
(74) *Attorney, Agent, or Firm* — Timothy J. Klima; Shuttleworth & Ingersoll, PLC

(57) ABSTRACT

A fluid flow machine has a main flow path in which at least one row of blades (2) is arranged, with at least one blade end of a blade row (2) being firmly connected to the main flow path confinement and, in an area of this fixed blade end at a sidewall (9), at least one longish, obstacle-type boundary layer barrier (11) is provided which in at least part of its course is oriented obliquely to the main flow direction, thereby deflecting fluid flowing near the sidewall towards the blade pressure side.

40 Claims, 19 Drawing Sheets

Meridional view, simplified

View Y-Y
View on hub

(56) References Cited

U.S. PATENT DOCUMENTS

| | | | |
|---|---|---|---|
| 2005/0141990 A1* | 6/2005 | Guemmer | 415/134 |
| 2009/0317232 A1* | 12/2009 | Guemmer | 415/58.5 |
| 2010/0098527 A1* | 4/2010 | Guemmer | 415/115 |
| 2010/0143140 A1* | 6/2010 | Guemmer | 416/193 A |

FOREIGN PATENT DOCUMENTS

| | | | |
|---|---|---|---|
| DE | 102006046933 | 4/2008 | |
| EP | 976928 A2 * | 2/2000 | F04D 29/32 |
| EP | 0978632 | 2/2000 | |
| EP | 1536147 | 6/2005 | |
| EP | 1688587 | 8/2006 | |
| EP | 1916385 | 4/2008 | |
| EP | 1927723 | 6/2008 | |
| GB | 2417053 | 2/2006 | |

OTHER PUBLICATIONS

European Search Report dated Apr. 12, 2013 from counterpart application.

* cited by examiner

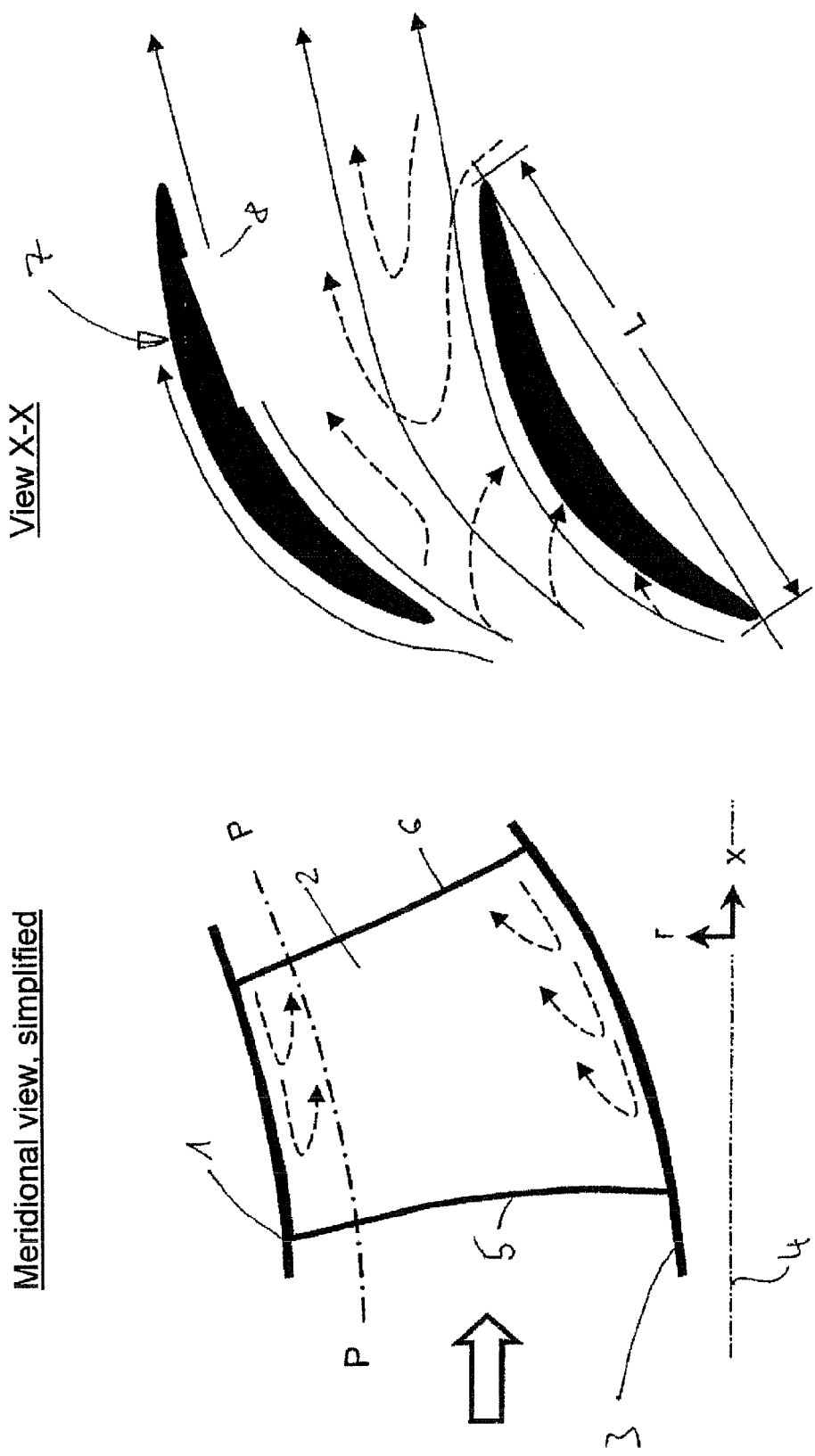

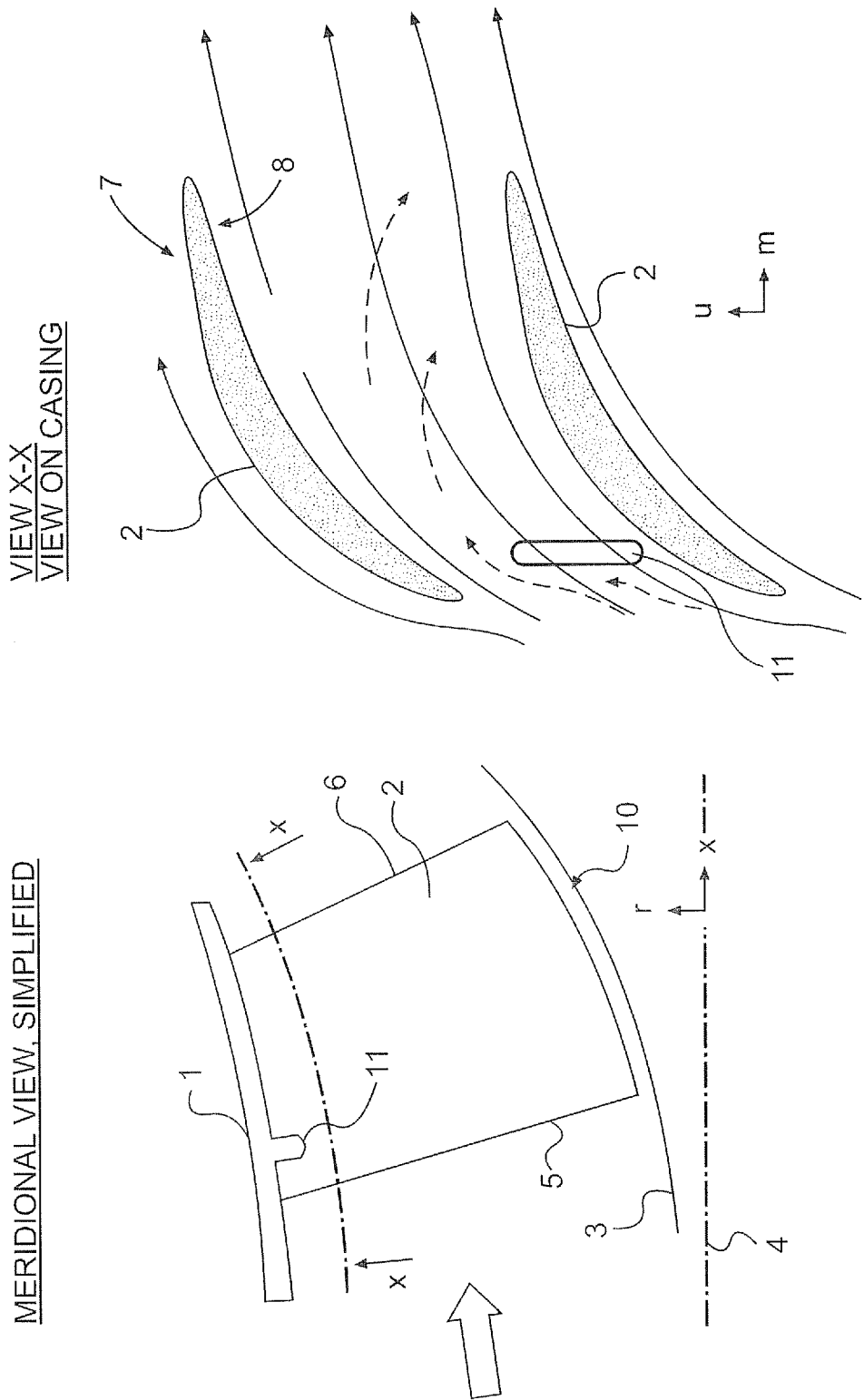

Fig. 2b:
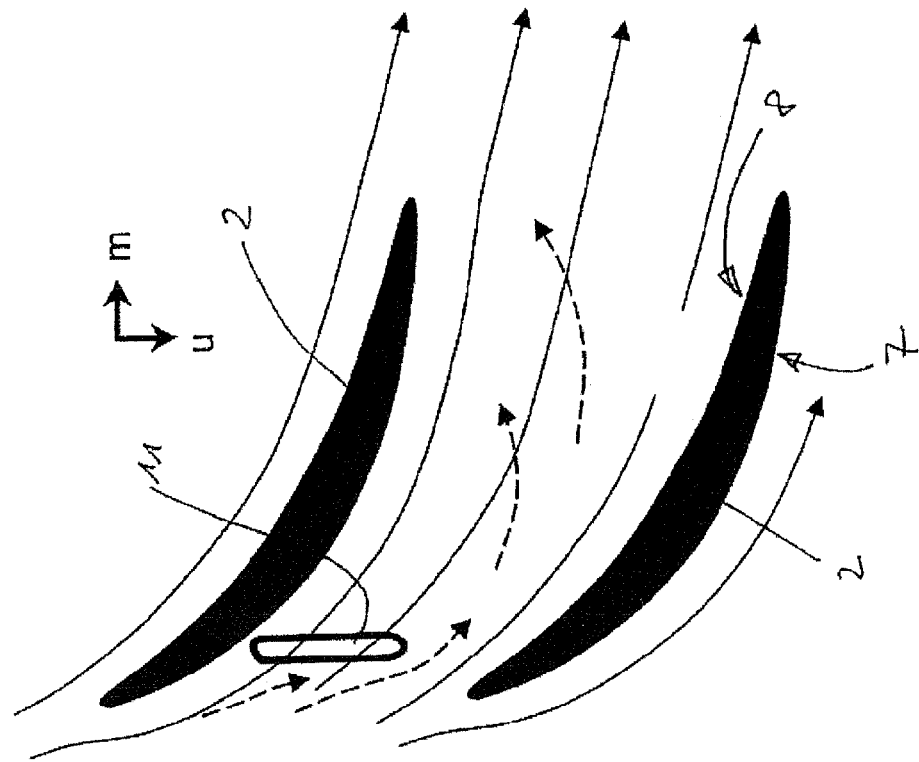
View Y-Y
View on hub
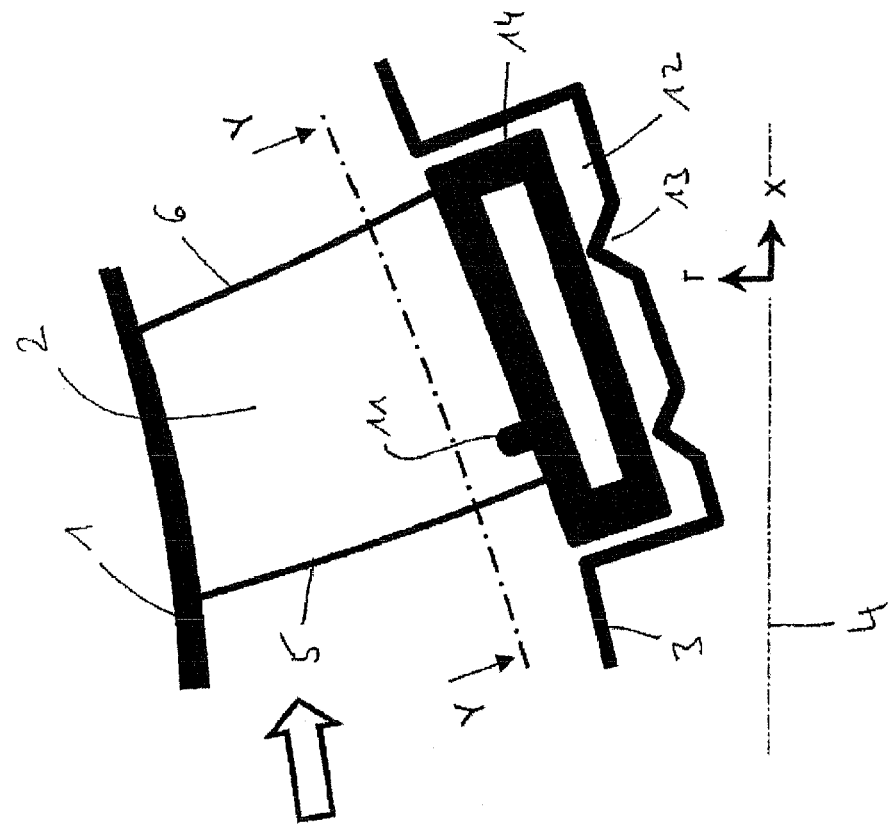
Meridional view, simplified

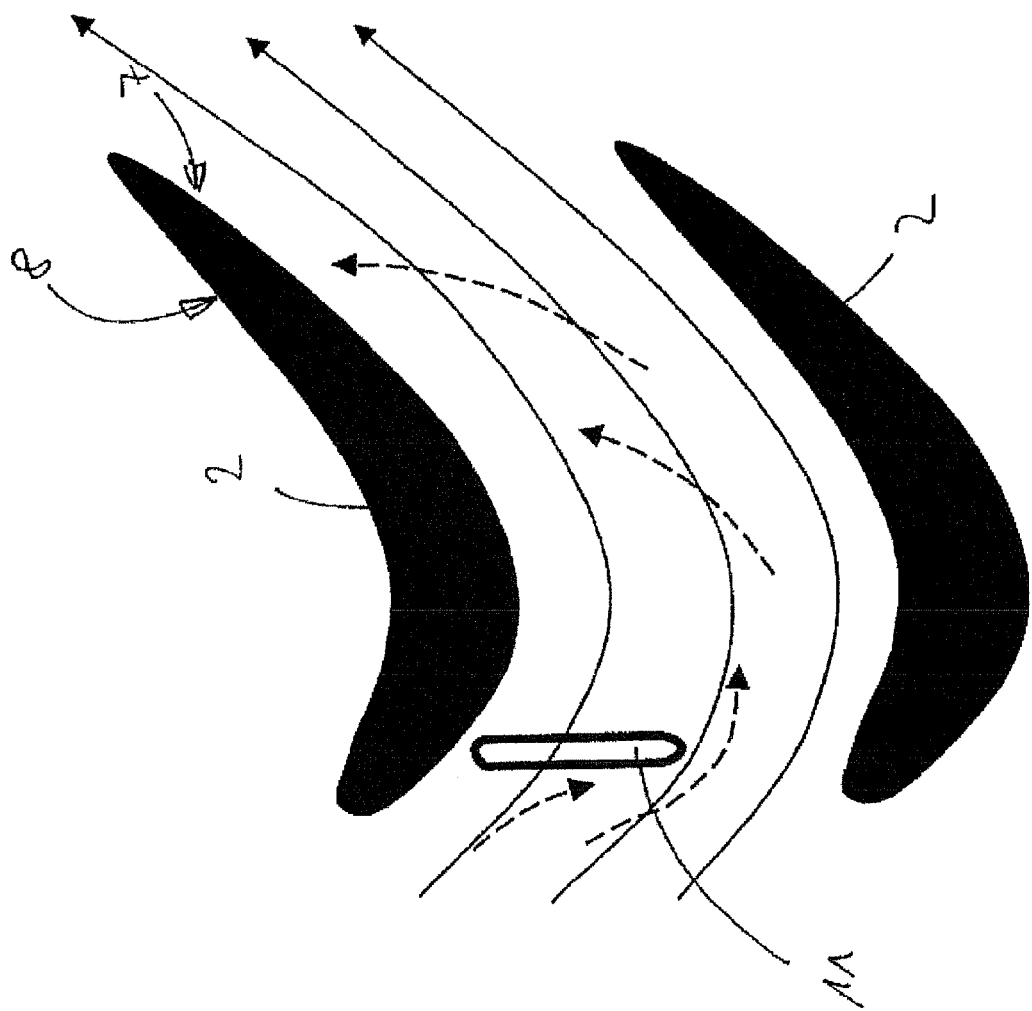
Fig. 2c: View Y-Y from Fig. 2b

Fig. 2d:
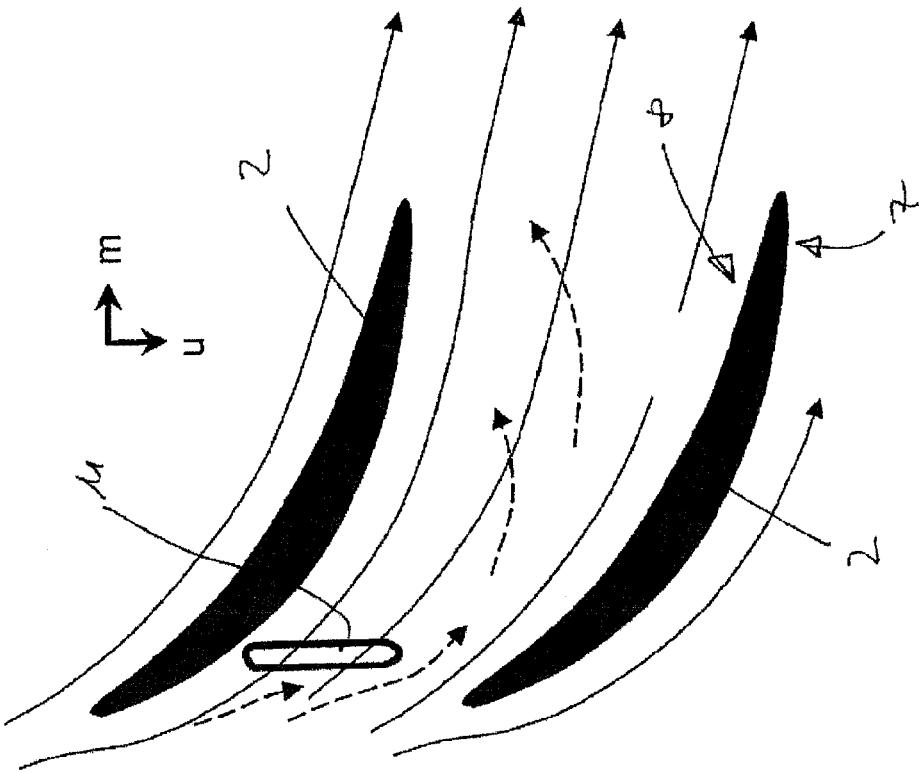
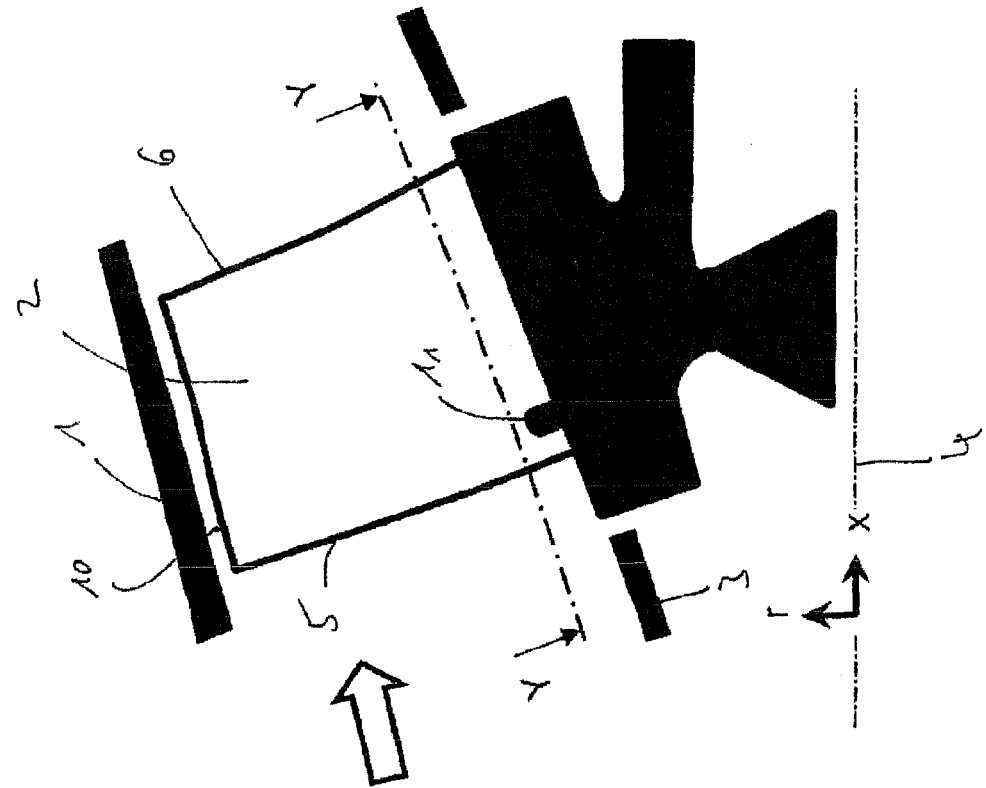

Figure 2E:
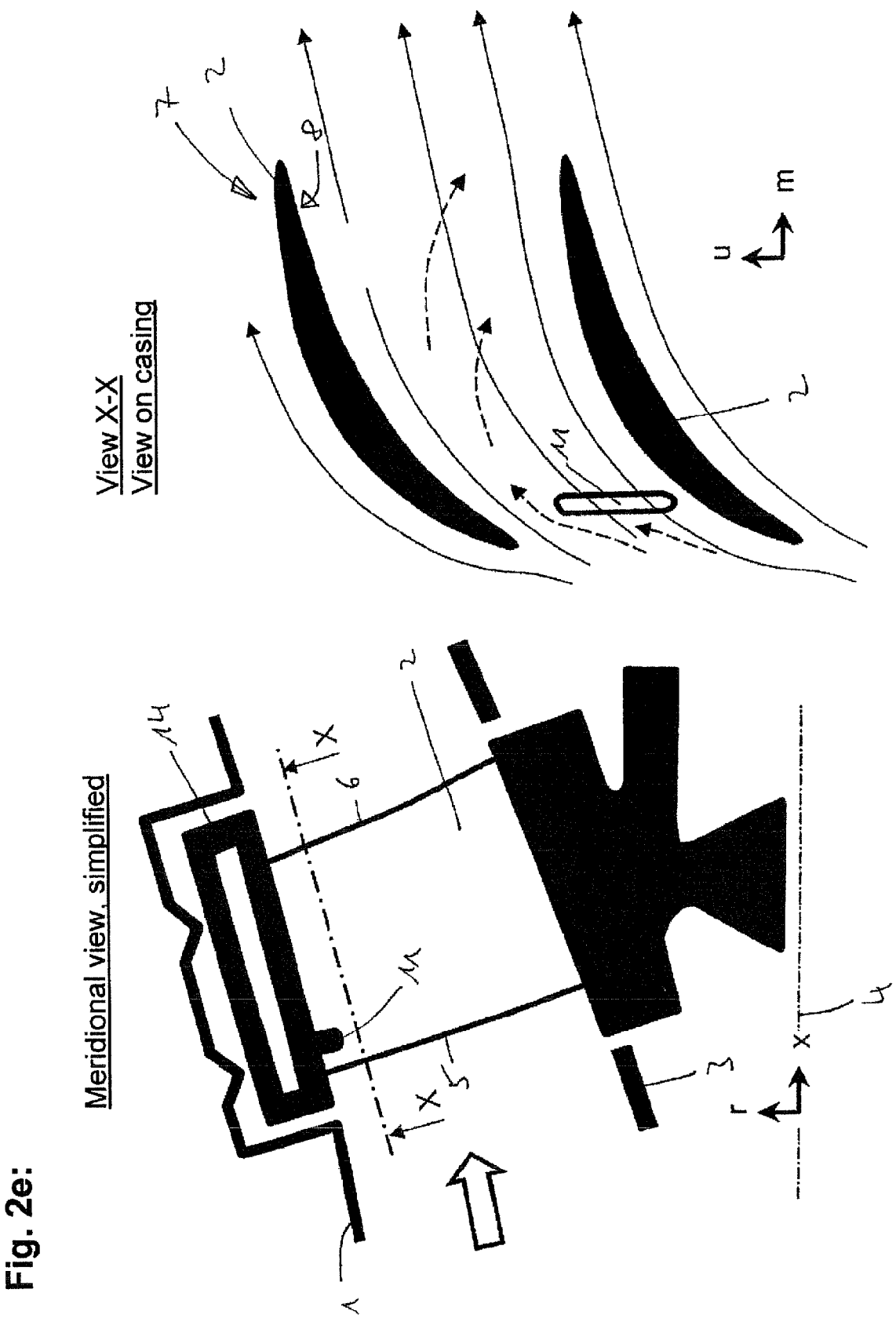

VIEW X-X FROM FIG.2e

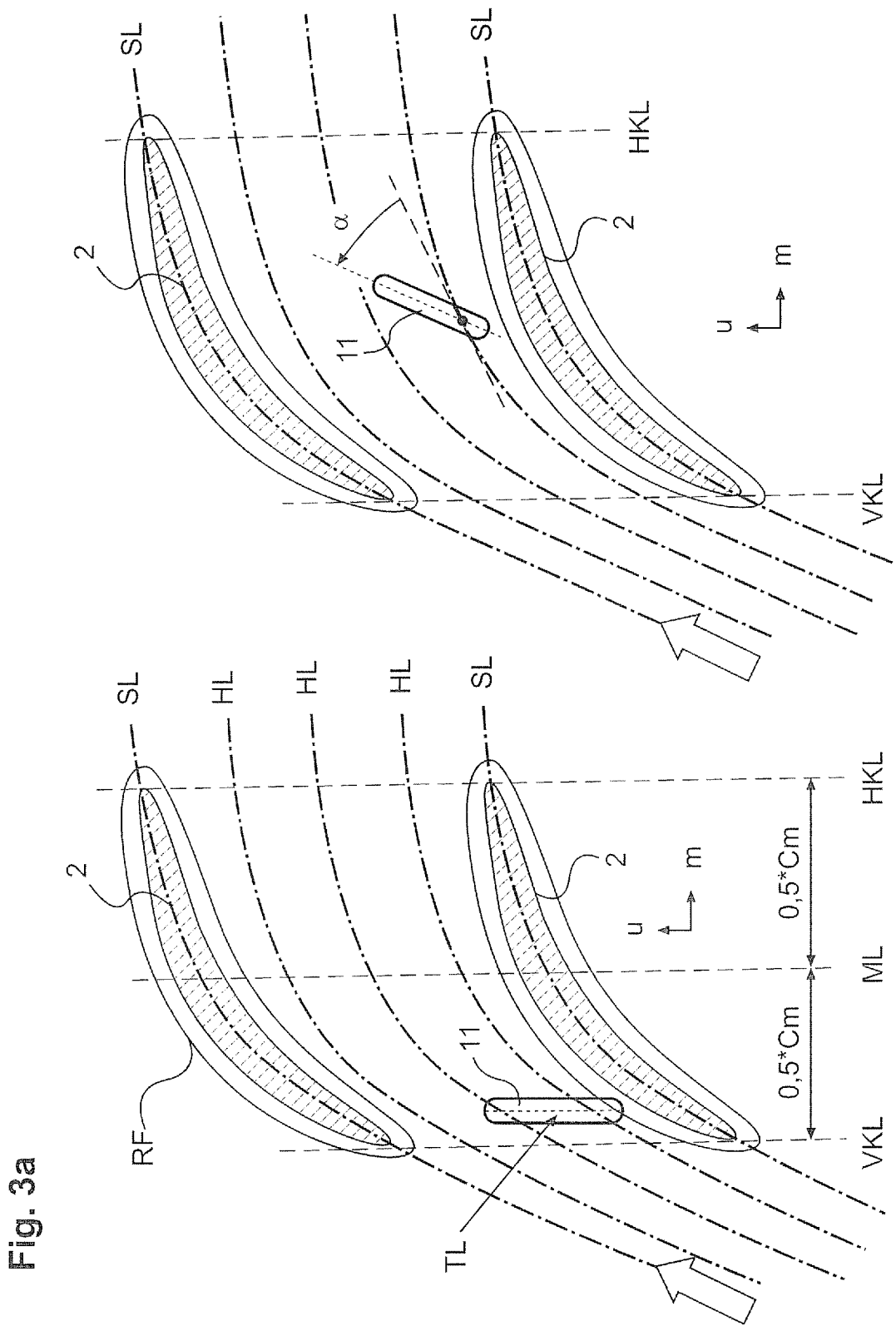

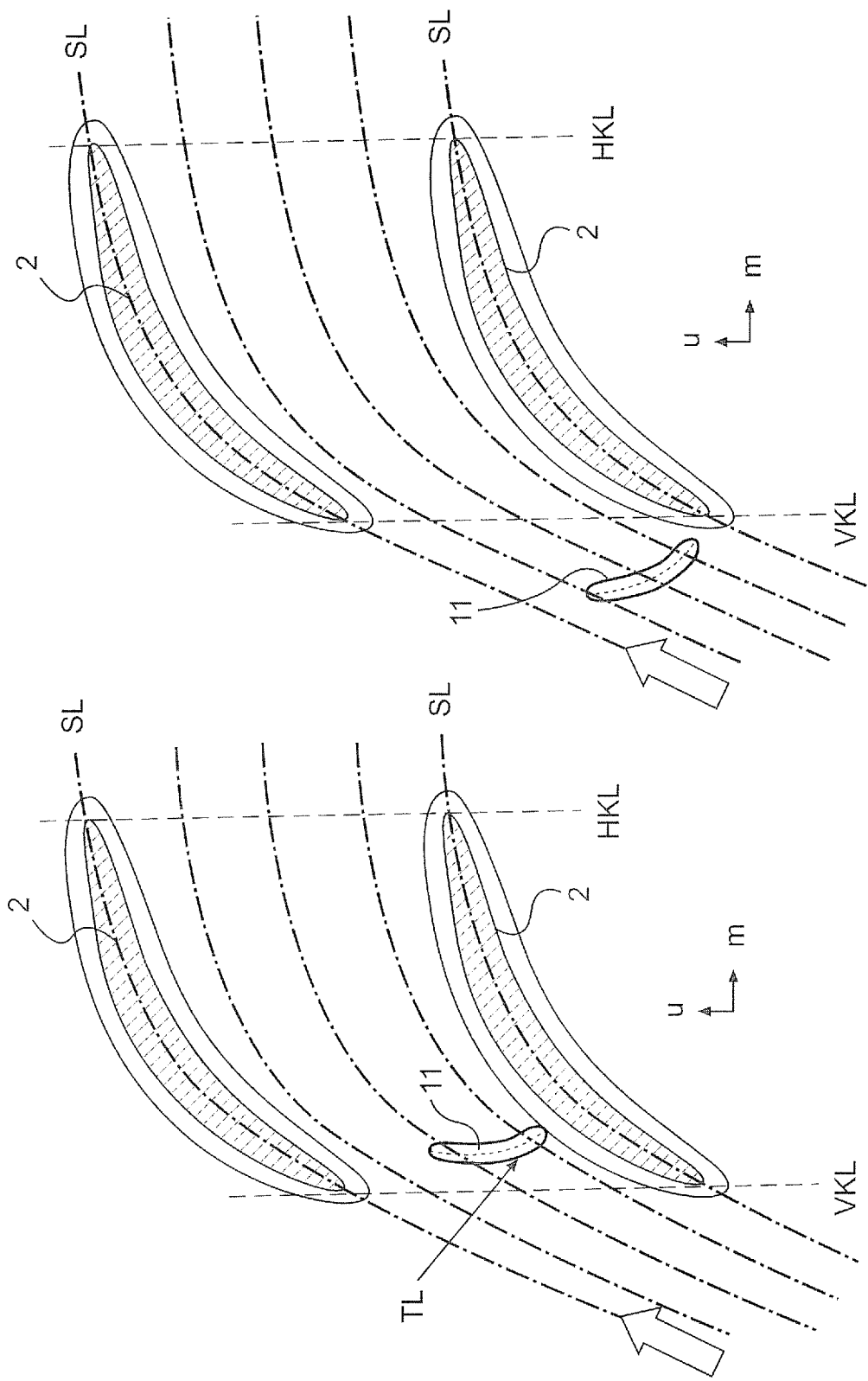

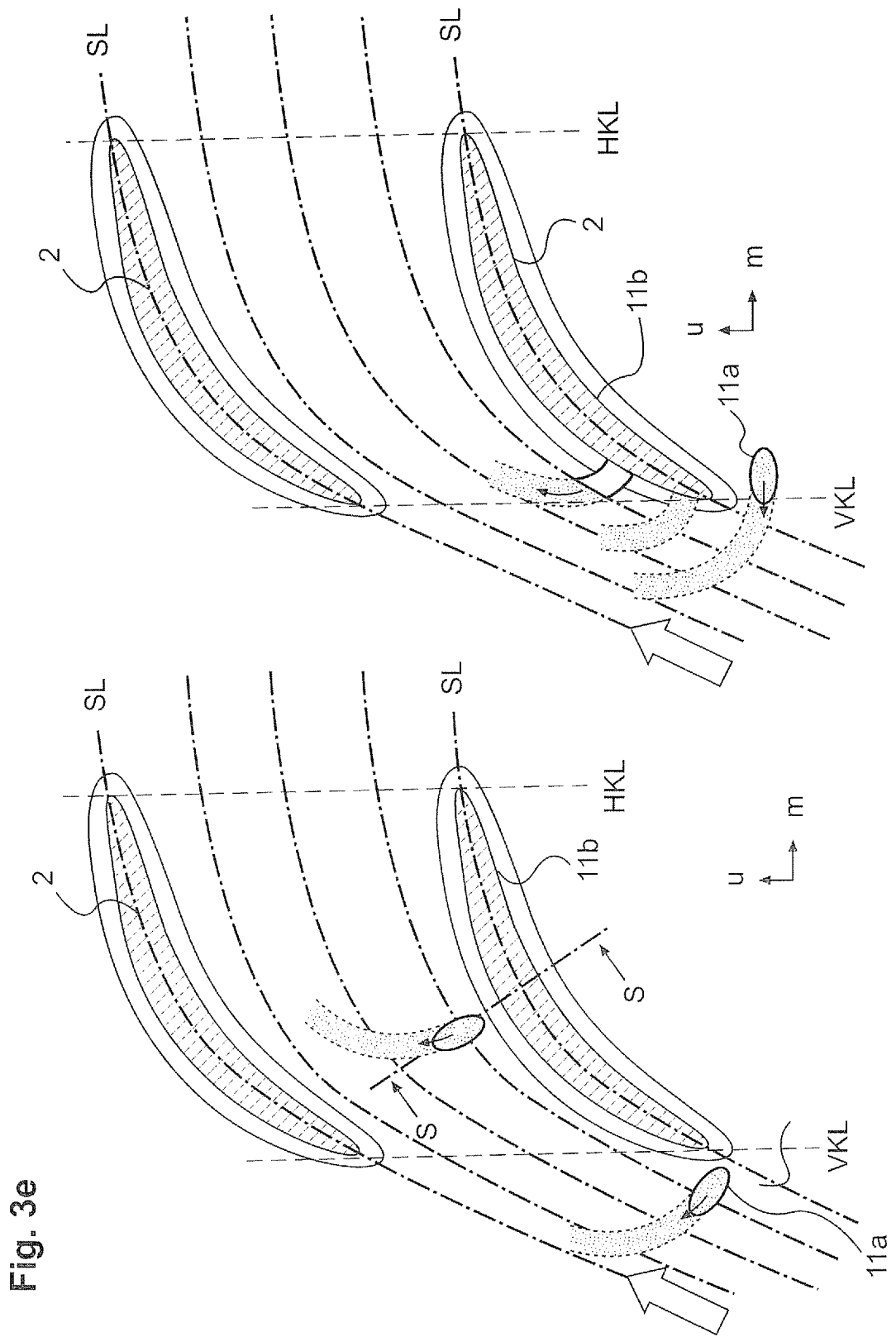

Figure 3C:
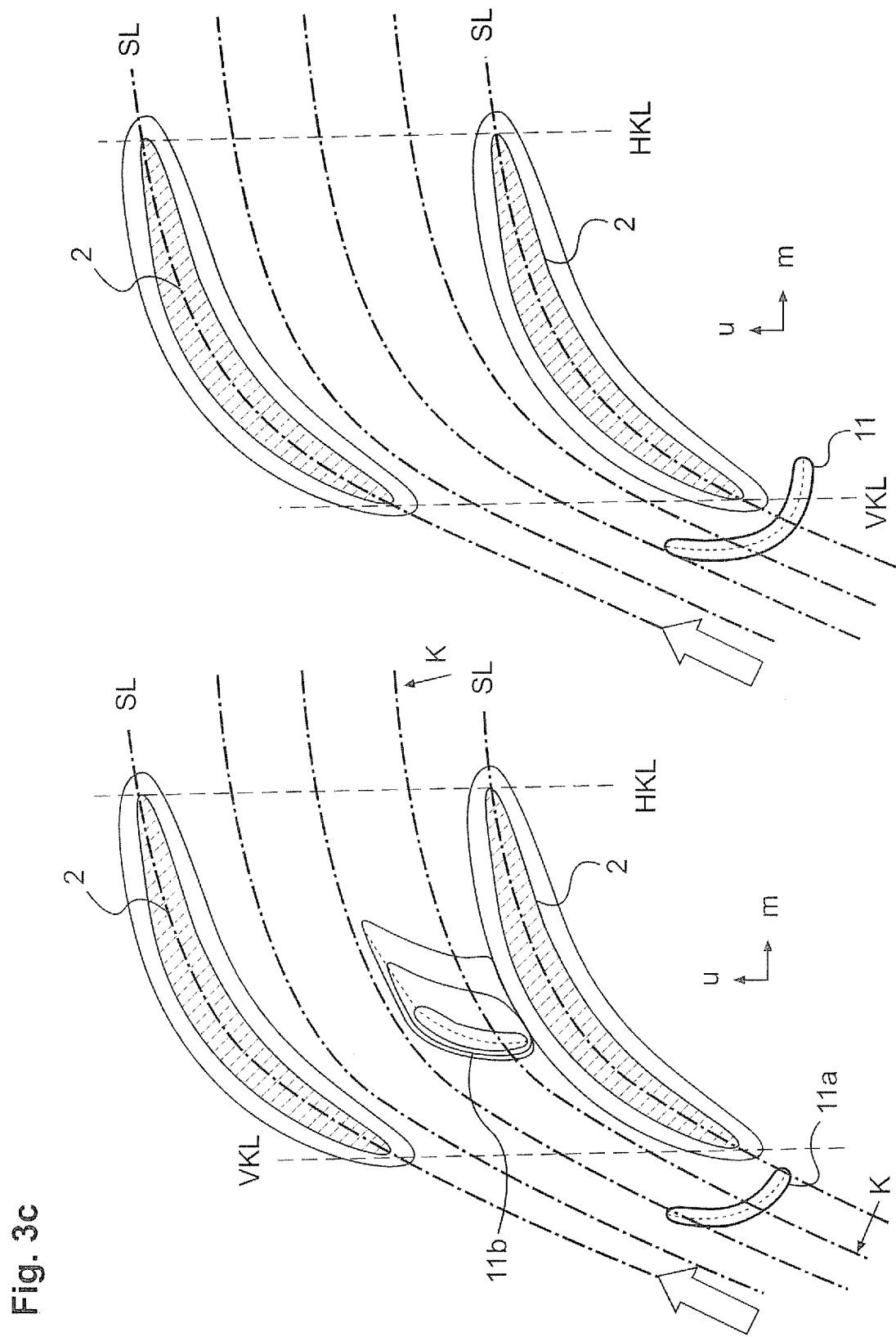

SECTION K-K FROM FIG. 3c

Fig. 5:
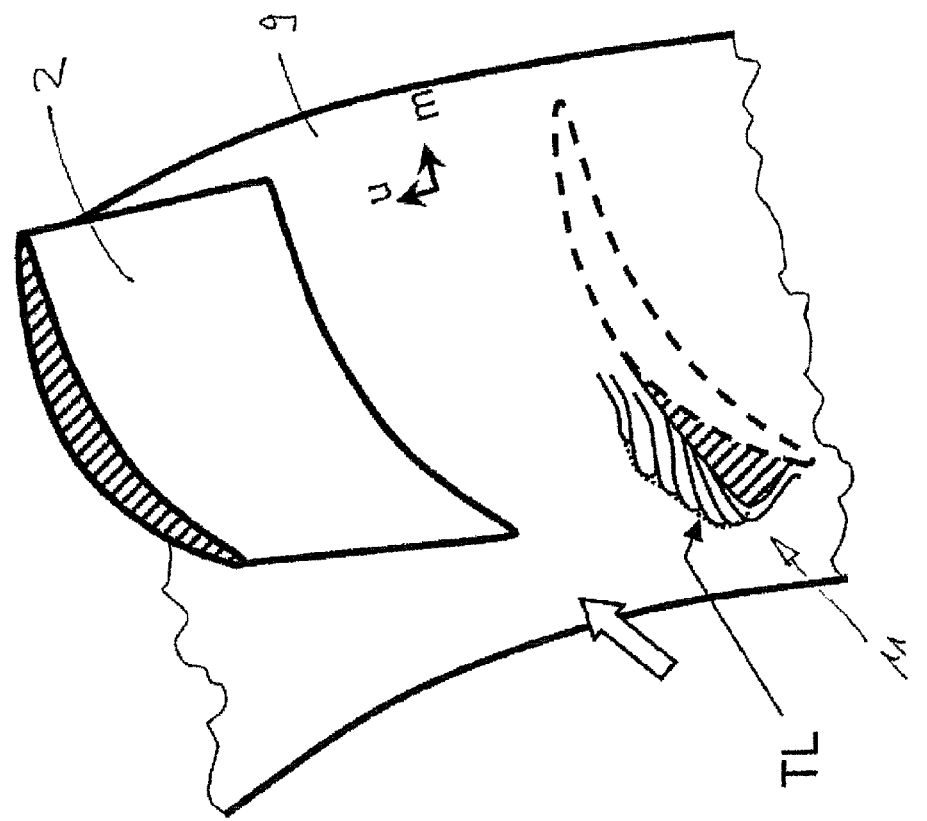
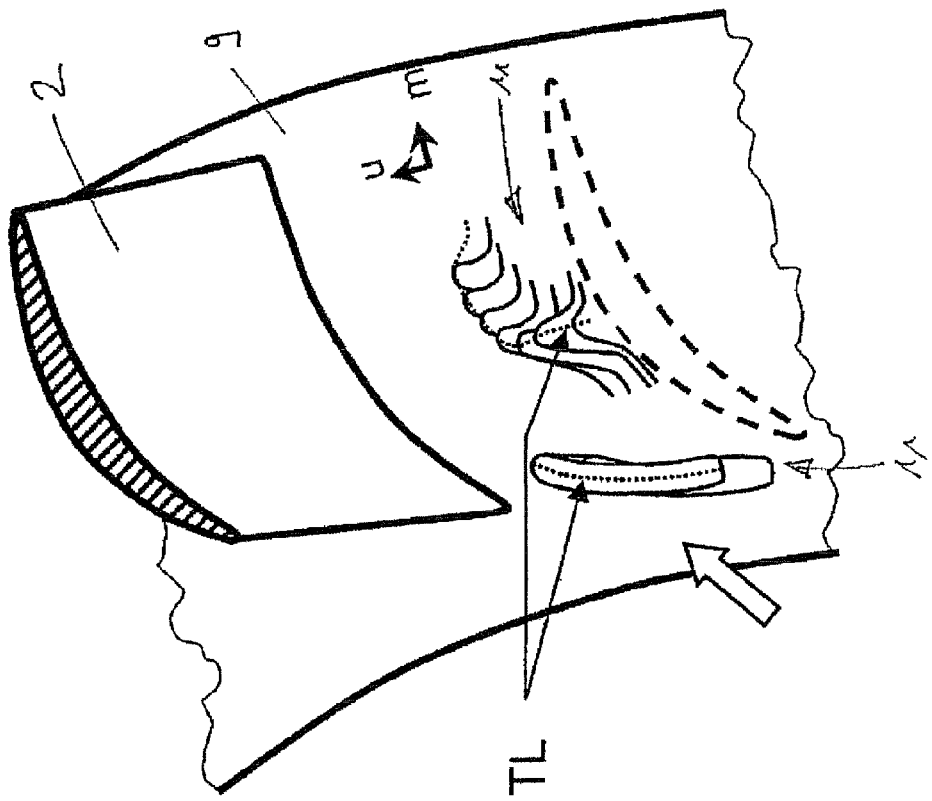

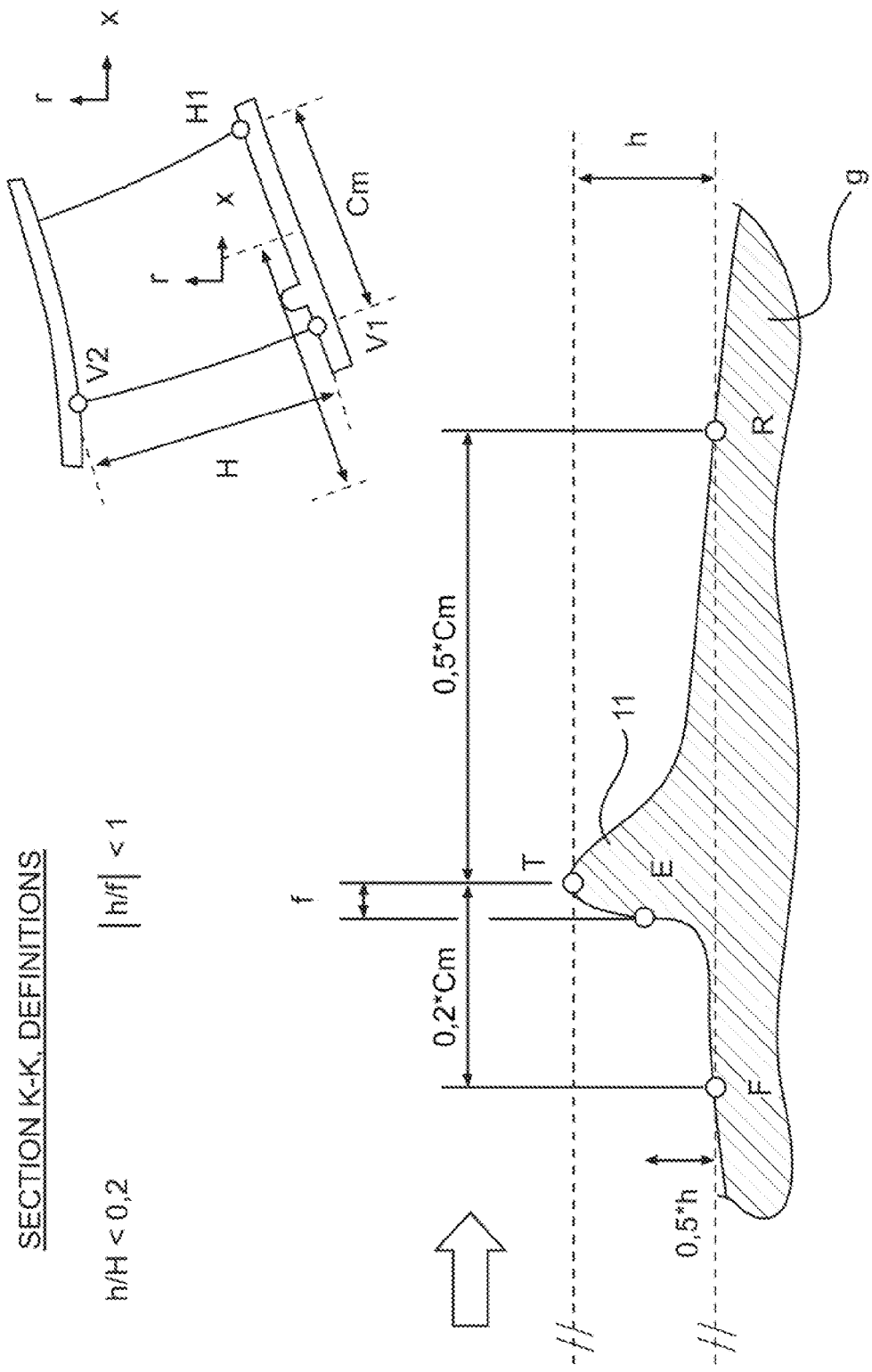

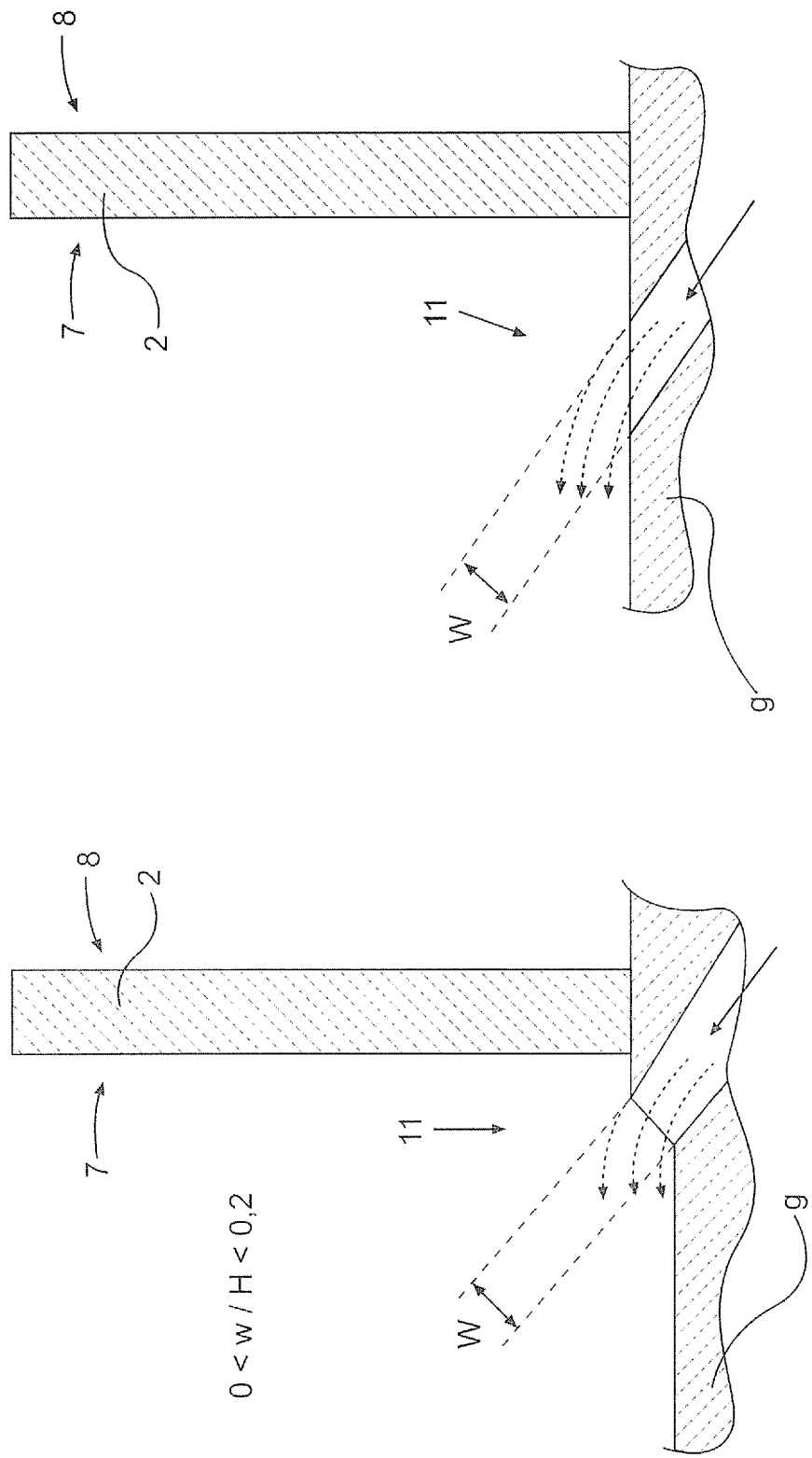

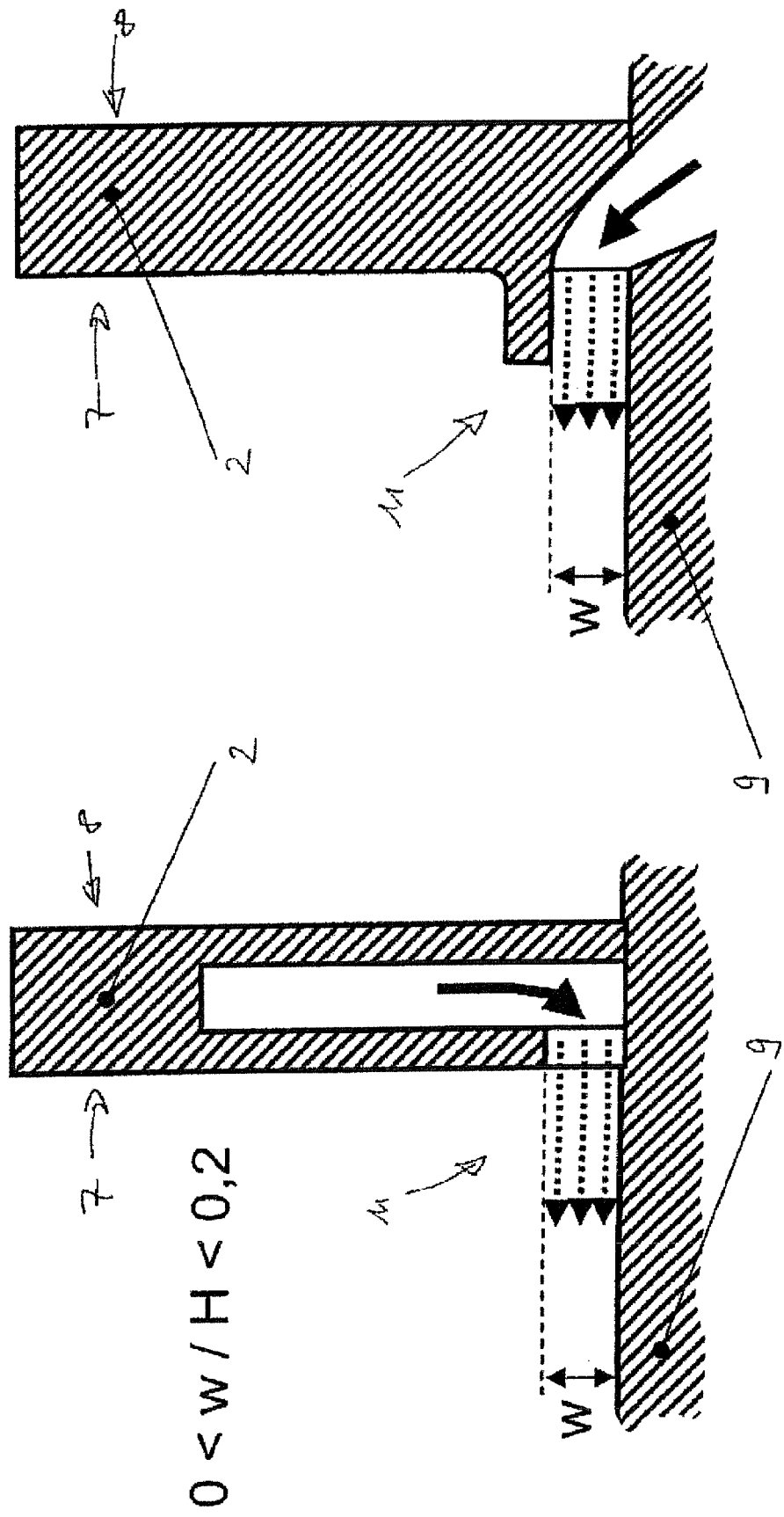

FLUID FLOW MACHINE WITH SIDEWALL BOUNDARY LAYER BARRIER

This application claims priority to German Patent Application DE 10 2008 060 424.0 filed Dec. 4, 2008, the entirety of which is incorporated by reference herein.

The aerodynamic loadability and the efficiency of fluid flow machines, such as blowers, compressors, pumps, fans and turbines, is limited by the growth and the separation of boundary layers on the blades and in particular on the hub and casing walls.

To remedy this problem in the case of high aerodynamic loading or flow deflection, respectively, and important boundary layer growth on the annulus duct sidewalls (hub or casing contour), the state of the art provides solutions only to a limited extent.

The concept of non-axially symmetric wall contouring belonging to the state of the art is of little benefit as it only mildly changes the sidewall contour. Specification U.S. Pat. No. 6,283,713 B1, for example, describes a sidewall contour which is differently, but still very smoothly formed on the blade pressure and suction side.

Specification U.S. Pat. No. 6,561,761 B1 describes a sidewall contour which decreases centrally in the passage and whose circumferential irregularity commences already far before the blade row and is characterized by a contour increase along both sides, pressure and suction sides, of the blade.

Specification U.S. Pat. No. 6,669,445 B2 describes a sidewall contour, which is characterized by smooth transitions and changes of contour height.

Specification U.S. Pat. No. 7,220,100 B2 discloses regions of a contour increase along the pressure side of turbine blades.

Finally, specification U.S. Pat. No. 7,354,243 B2 discloses a complex sidewall contour characterized by low-amplitude sinuosity and, consequently, smooth changes of contour in the direction of flow.

All these concepts are commonly intended to attain a mild change of the pressure field on the sidewall contour in the blade passage, rather than providing an obstacle effecting intensive re-distribution of flow.

The state of the art lacks effective measures for significantly reducing the strong secondary flow in the area of fixed, in particular shrouded, blade rows of fluid flow machines.

A known, active method is the injection of an energy-rich fluid jet in the direction of the main flow through the blade row concerned. The principle of this concept is the introduction of additional energy to be provided at preferential locations of the flow field, with the amount of energy being considerable and substantially reducing the net gain in efficiency.

Accordingly, while the general concept of boundary layer influencing by changing the sidewall as well as by fluid injection is contained in the state of the art, known concepts for influencing the sidewall boundary layer flow in blade arrangements with fixed blade end, i.e. gapless connections of blade end and main flow path confinement, have only limited effect.

The flow in the blade rows of aerodynamically highly loaded fluid flow machines is characterized by a very high degree of flow deflection to be attained. The required re-direction of the fluid flow can be so extreme, either in parts of the blade height or along the entire blade height, that premature separation of the boundary layer flow in the peripheral area on the hub and/or casing walls will occur with a conventional design.

Conventional blade rows without additional design features for stabilizing the wall boundary layers, as shown in FIG. 1, are unsuitable due to the occurrence of extremely high pressure losses and the inability to attain the flow deflection required, with both phenomena being caused by heavy secondary flows, boundary layer separation and reflow. In consequence, the fluid flow machine will have a generally bad performance as regards efficiency.

Blade rows with a design according to the state of the art, see FIG. 1, have too small an operating range and too high losses to attain the operating characteristics required for modern fluid flow machines, this being due to the high aerodynamic loading of the sidewall boundary layers, i.e. the boundary layers existing on the main flow path confinement. The solutions proposed so far for fluid supply on the flow path confinement primarily served for influencing the gap leakage flow on the rotor blade tips, with considerable amount of additional energy being applied.

A broad aspect of the present invention is to provide a fluid flow machine of the type specified at the beginning which, while avoiding the disadvantages of the state of the art, is characterized by increased aerodynamic loading and improved efficiency.

The present invention therefore relates to blades of fluid flow machines, such as blowers, compressors, pumps, fans and turbines of the axial, semi-axial and radial type using gaseous or liquid working medium. The fluid flow machine may include one or several stages, each stage having a rotor and a stator, in individual cases, the stage is formed by a rotor only. The rotor includes a number of blades, which are connected to the rotating shaft of the machine and impart energy to the working medium.

The rotor may be designed with or without a shroud at the outward blade end. The stator includes a number of stationary vanes, which may either feature a fixed or a free vane end on the hub and on the casing side. Rotor drum and blading are usually enclosed by a casing, in other cases (e.g. aircraft or ship propellers) no such casing exists.

The machine may also feature a stator, a so-called inlet guide vane assembly, upstream of the first rotor. Departing from the stationary fixation, at least one stator or inlet guide vane assembly may be rotatably borne, to change the angle of incidence.

Variation is accomplished for example via a spindle accessible from the outside of the annulus duct.

In an alternative configuration, multi-stage types of said fluid flow machines may have two counter-rotating shafts, with the direction of rotation of the rotor blade rows alternating between stages. Here, no stators exist between subsequent rotors.

Finally, the fluid flow machine may—alternatively—feature a bypass configuration such that the single-flow annulus duct divides into two concentric annuli behind a certain blade row, with each of these annuli housing at least one further blade row.

More particularly, the present invention relates to a fluid flow machine with a main flow path in which at least one row of blades is arranged, with at least one blade end of a blade row being firmly connected to the main flow path confinement and at least one boundary layer barrier being provided in the area of this fixed blade end and projecting from the sidewall into the main flow path, with the boundary layer barrier, for the purpose of deflecting the wall-near boundary layer flow from the profile suction side towards the adjacent pressure side, being arranged upstream of the blade trailing edge and, in at least part of its course, extending accordingly obliquely to the main flow direction—as measured by the course of the blade profile skeleton line shifted into the point considered on the sidewall.

According to the present invention, a particular blade row for application in fluid flow machines is provided which in the area of at least one of its ends is provided at the main flow path confinement with a specially formed boundary layer barrier deflecting the boundary layer fluid flowing closely along the sidewall towards the profile pressure side.

Figure 2F:
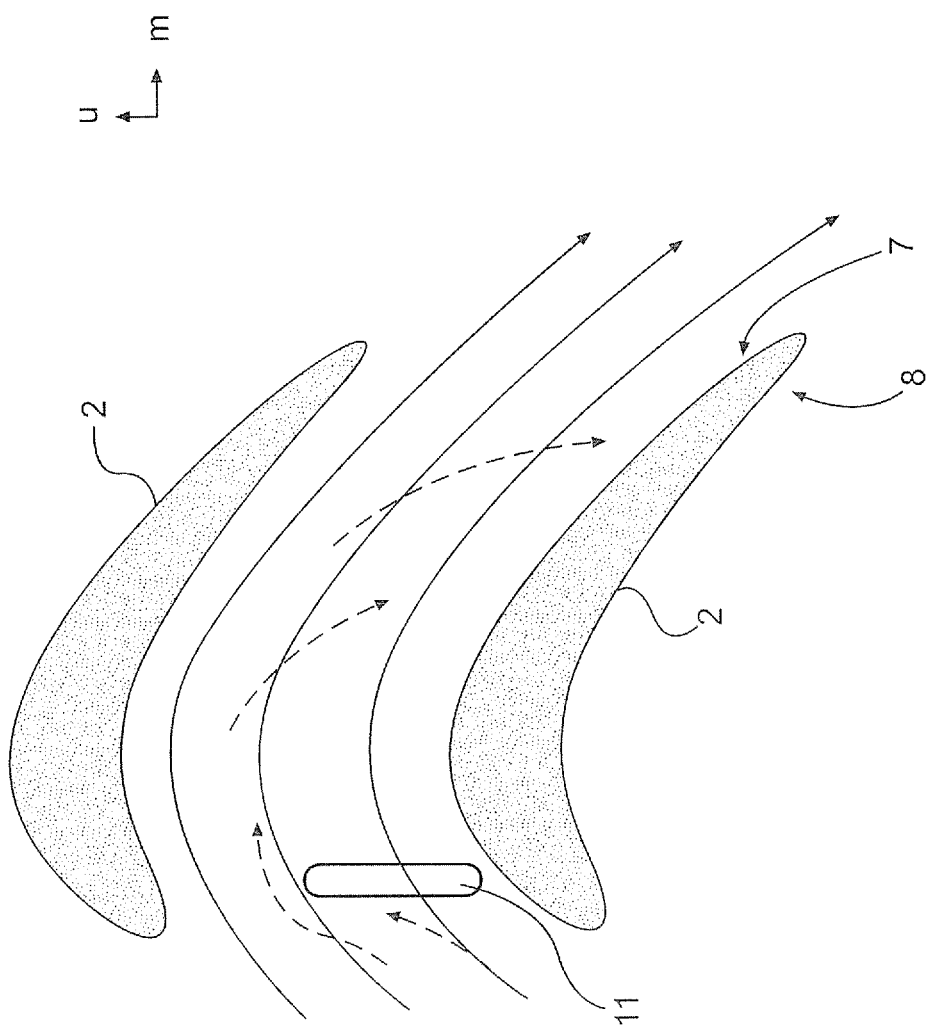
Figure 3D:
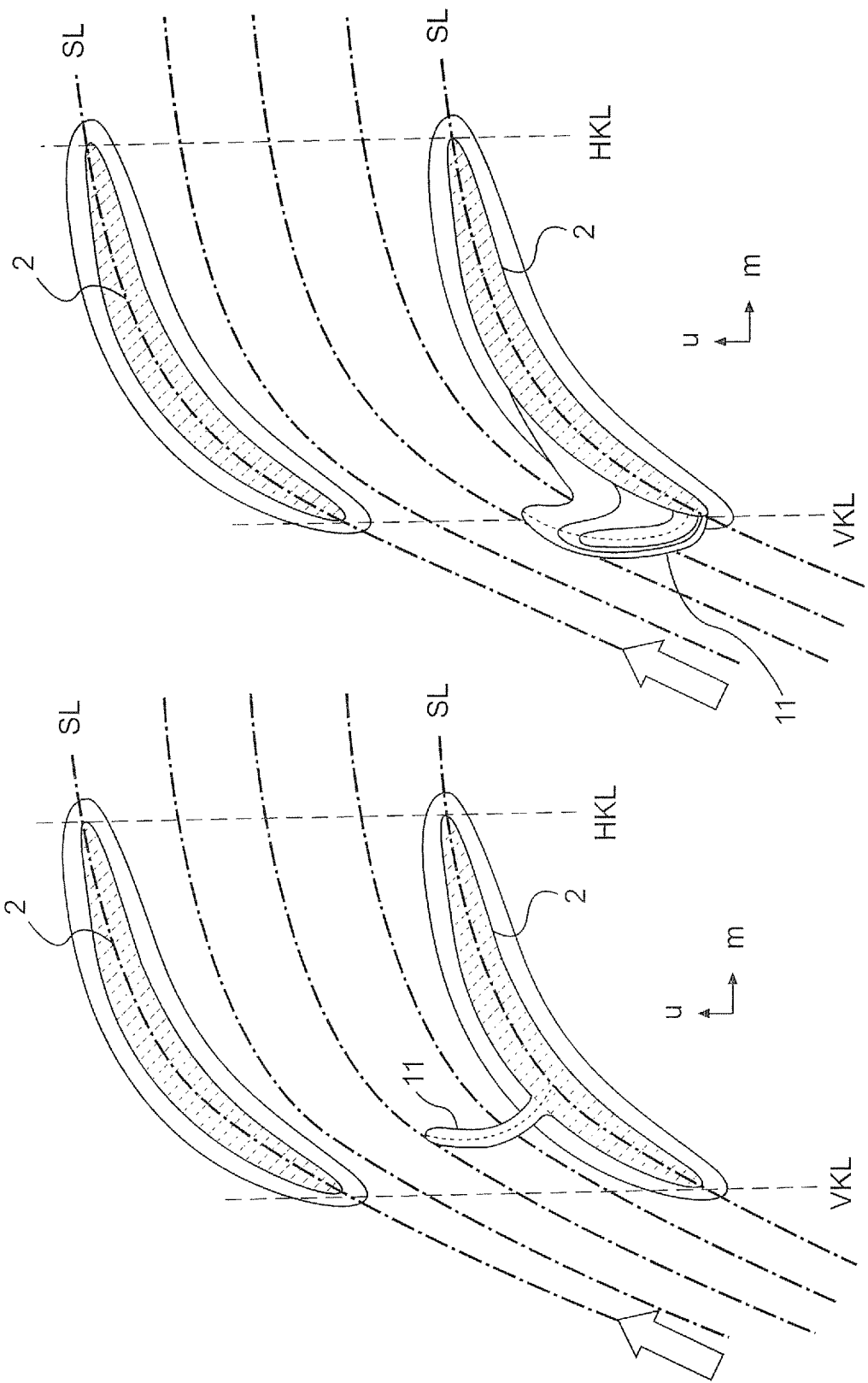
Figure 3F:
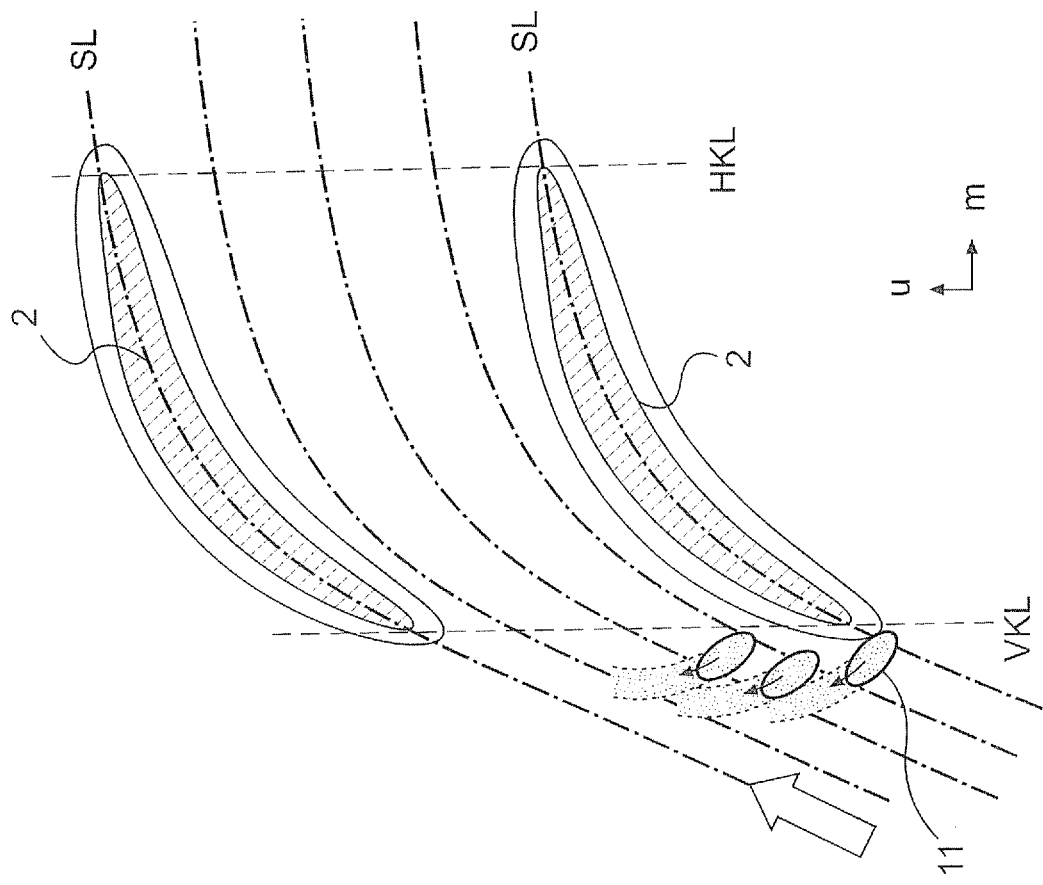
Figure 4A:
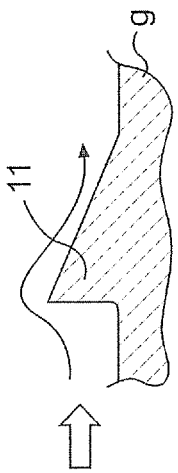
Figure 4B:
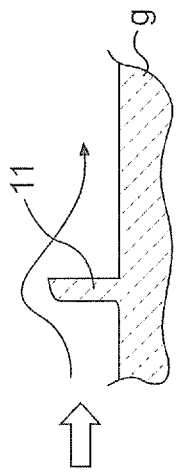
Figure 4C:
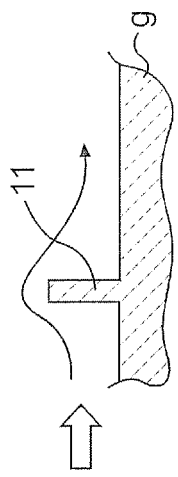
Figure 4D:
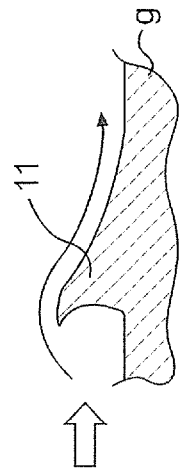
Figure 4E:
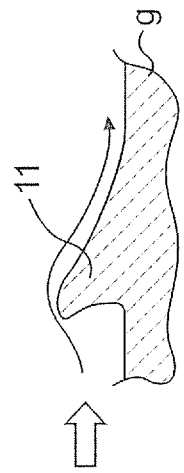
Figure 4F:
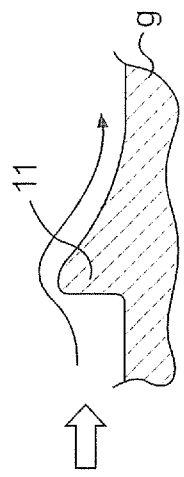
Figure 4G:
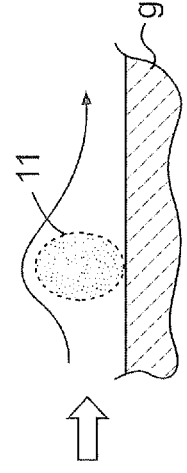
Figure 4H:
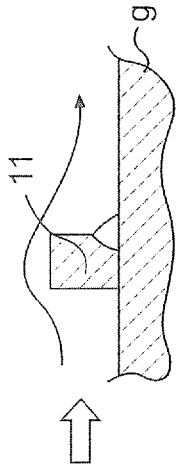
Figure 4I:
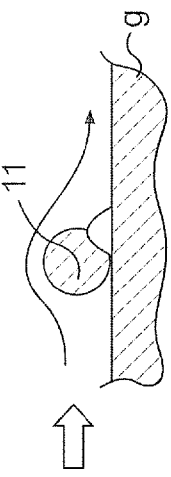
Figure 4J:
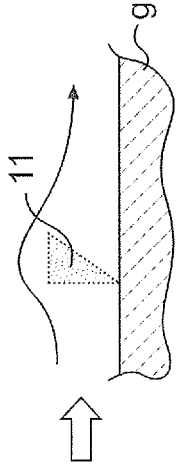
Figure 4K:
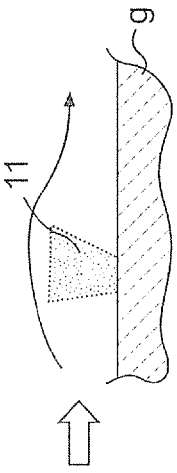
Figure 4L:
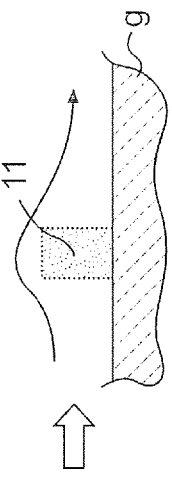
Figure 7A:
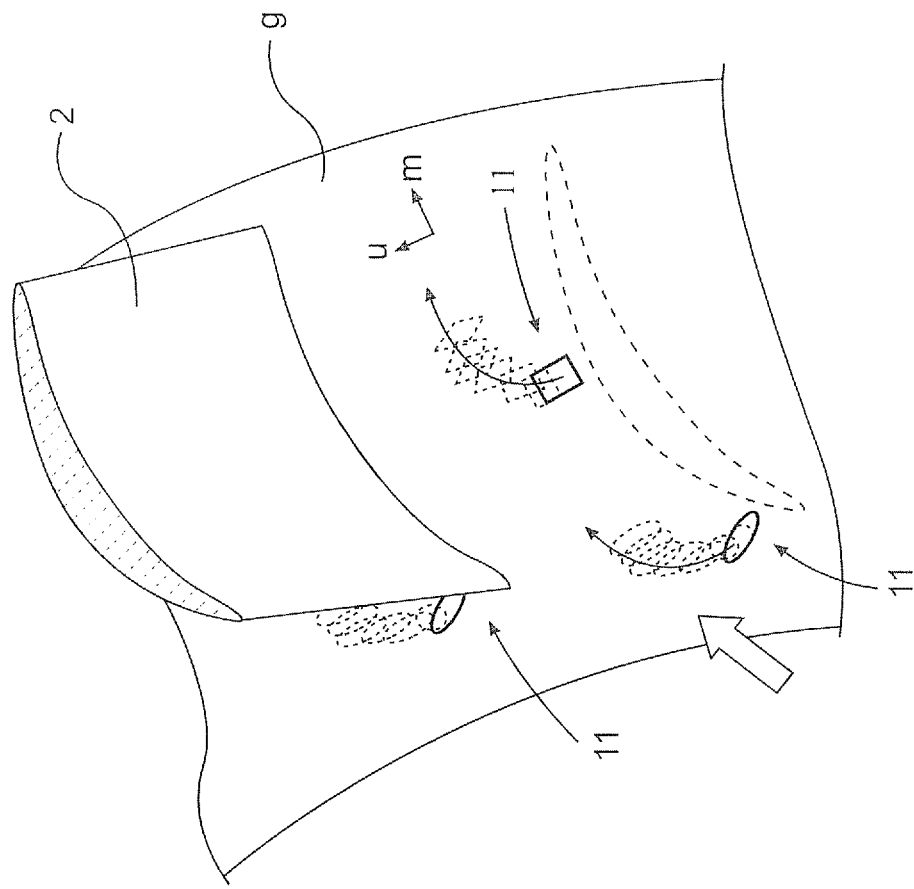

The present invention is more fully described in light of the accompanying figures showing preferred embodiments:

FIG. 1 shows a blade in accordance with the state of the art,

FIG. 2a shows a stator vane row in accordance with the present invention with free vane end at the hub and load-transmitting fixed vane end at the casing, boundary layer barrier at the casing, FIG. 2b shows a stator vane row in accordance with the present invention, with load-free fixed vane end (shroud) at the hub, boundary layer barrier at the hub, FIG. 2c is a View Y-Y from FIG. 2b, case of a turbine blade row, FIG. 2d shows a rotor blade row in accordance with the present invention with load-transmitting fixed blade end at the hub and free blade end at the casing, boundary layer barrier at the hub, FIG. 2e shows a rotor blade row in accordance with the present invention with load-free fixed blade end (shroud) at the casing, boundary layer barrier at the casing, FIG. 2f is a View X-X from FIG. 2e, case of a turbine blade row, FIG. 3a shows boundary layer barriers in accordance with the present invention, annulus duct wall top views at a fixed blade end, FIG. 3b shows further boundary layer barriers in accordance with the present invention, annulus duct wall top views at a fixed blade end, FIG. 3c shows further boundary layer barriers in accordance with the present invention, annulus duct wall top views at a fixed blade end, FIG. 3d shows further boundary layer barriers in accordance with the present invention, annulus duct wall top views at a fixed blade end, FIG. 3e shows further boundary layer barriers in accordance with the present invention, annulus duct wall top views at a fixed blade end, FIG. 3f shows a further fluidic boundary layer barrier in accordance with the present invention, annulus duct wall top views at a fixed blade end, staggered arrangement of fluid transverse jet ports, FIG. 4 shows advantageous cross-sectional shapes of the boundary layer barrier in accordance with the present invention, plane K (section K-K from FIG. 3c), FIG. 5 shows boundary layer barriers in accordance with the present invention, structural increase, perspective representations, FIG. 6 shows a boundary layer barrier in accordance with the present invention, plane K (section K-K from FIG. 3c), definitions, FIG. 7a shows a boundary layer barrier in accordance with the present invention, fluid transverse jet, perspective representation, FIG. 7b shows boundary layer barriers in accordance with the present invention, fluid transverse jet, section S-S from FIG. 3e, and FIG. 7c shows further boundary layer barriers in accordance with the present invention, fluid transverse jet, section S-S from FIG. 3e.

A conventional state-of-the-art blade row 2, as shown in FIG. 1, features no sidewall boundary layer barriers provided on the main flow path confinement 9 near the suction side for reducing the normal secondary flow. The right-hand side of FIG. 1 shows, in simplified form, a rotor blade or a stator vane row 2 in meridional section with the inflow passing from the left to the right (bold arrow). While on conventional blades 2 the flow passes the individual profile sections of the blades 2 (see View X-X) from the leading edge 5 (LE (VK)) to the trailing edge 6 (TE (HK)) following the course of the blade passage, detrimental secondary flows occur at hub 3 or casing 1 near the flow path confinement, resulting in local reflow areas with partly detached flow (see broken arrows in the left and right-hand part of FIG. 1).

FIG. 2a shows the example of a blade row 2 according to the present invention, here a stator with fixed blade end at the casing 1 on which the mechanical loads occurring are transmitted to the physical structure of the fluid flow machine and which hereinafter is referred to as 'load-transmitting fixed blade end'. A free blade end with running gap 10 is provided at the hub 3.

The blade 2, being flown from the left to the right, is shown in meridional section in the left-hand part of FIG. 2a and in View X-X (casing view) in the right-hand part of FIG. 2a.

The stator, on its load-transmitting fixed blade end, is provided with at least one sidewall boundary layer barrier 11 which is schematically shown in FIG. 2a.

FIG. 2b shows the example of a blade row according to the present invention, here a stator with load-transmitting fixed blade end at the casing 1 and fixed blade end at the hub 3. Shroud 3 at the hub and rotor shaft perform a rotary movement relative to each other, with sealing being provided by sealing fins 13 in a cavity 12 surrounding the shroud. Such a fixed blade end is hereinafter referred to as "load-free fixed blade end".

The blade, being flown from the left to the right, is shown in meridional section in the left-hand part of FIG. 2b and in View Y-Y (hub view) in the right-hand part of FIG. 2b.

The stator, on its load-free fixed blade end, is provided with at least one sidewall boundary layer barrier 11 which is schematically shown in FIG. 2b.

FIG. 2c shows the View Y-Y of a blade row 2 according to the present invention, here a stator, for the similarly invention-relevant case that the blade row is provided in a turbine.

FIG. 2d shows the example of a blade row according to the present invention, here a rotor with load-transmitting fixed blade end at the hub 3. A free blade end with running gap 10 is provided at the casing 1.

The blade, being flown from the left to the right, is shown in meridional section in the left-hand part of FIG. 2d and in View Y-Y (hub view) in the right-hand part of the figure.

The rotor, on its load-transmitting fixed blade end, is provided with at least one sidewall boundary layer barrier, which is schematically shown in FIG. 2d.

FIG. 2e shows the example of a blade 2 according to the present invention, here a rotor with load-transmitting fixed blade end at the hub and load-free fixed blade end (with shroud) at the casing 1. Shroud 14 and casing 1 perform a rotary movement relative to each other, with sealing being provided by sealing fins in a cavity surrounding the shroud 14. The blade 2, being flown from the left to the right, is shown in meridional section in the left-hand part of FIG. 2e and in View X-X (casing view) in the right-hand part of FIG. 2e.

The rotor, on its load-free fixed blade end, is provided with at least one sidewall boundary layer barrier 11 which is schematically shown in FIG. 2e.

FIG. 2f shows the View X-X of a blade row 2 according to the present invention, here a rotor, for the similarly invention-relevant case that the blade row 2 is provided in a turbine.

The blade row as represented in FIGS. 2a, 2b, 2c and 2d is provided with only one boundary layer barrier 11 per blade passage. Other than in this representation, the present invention also provides for the arrangement of several barriers in one blade passage.

It can be favorable according to the present invention if a boundary layer barrier 11 is provided in the vicinity of the blade suction side 7, or in the vicinity of the blade leading edge, or directly adjacent to the blade suction side 7, or directly adjacent to the blade leading edge, and in its further course departs from the respective blade leading edge or the blade suction side, respectively, essentially transversely and obliquely to the main flow.

Also favorable according to the present invention is a boundary layer barrier 11 with curved course winding around the leading edge of the blade 2.

While all further graphical representations show compressor or pump blade profiles, the inventive features shown likewise apply to turbine blade rows.

FIG. 3a shows on both its left and right-hand side a blade row 2 according to the present invention with fixed blade end in a developed flow line section in the vicinity of the main flow path confinement, approximately corresponding to View X-X or Y-Y, i.e. in the plane established by the meridional flow direction m and the circumferential direction u. For clarity, only two sidewall profile sections of the blade row 2 according to the present invention have been shown. As indicated by the bold arrow, inflow is obliquely from the left to the right.

Each profile has a skeleton line SL which for the purpose of the present invention is being given, within the profile, by the centerline between pressure and suction side and, outside of the profile, by the respective tangential extension of this centerline at the leading and trailing edges.

Plotted are three further lines designated HL which are generated by shifting the skeleton line in the circumferential direction u. These are auxiliary lines which are generally available at any location of the blade passage. The auxiliary lines essentially show the flow direction within the blade passage, thereby enabling the angulation of a boundary layer barrier provided by a correspondingly structured build-up on the sidewall surface to be locally dimensioned relative to the main flow.

The left-hand side of FIG. 3a shows the example of a very simple, rectilinear structure of a boundary layer barrier 11 which in accordance with the present invention is advantageously situated in the forward half of the blade passage and, in the present example, extends exactly in the circumferential direction of the machine. The boundary layer barrier 11 is characterized by a pronounced inclination relative to the auxiliary lines and, thus, to the main flow. The top edge of the boundary layer barrier, i.e. the connecting line of the points of maximum local elevation, is shown along the boundary layer barrier with a dotted line. It is herein designated as top line TL.

Boundary layer barriers 11 according to the present invention are here provided upstream of the trailing edge line TEL (HKL) 16. It is advantageous if at least one boundary layer barrier is provided upstream of the line (centerline 17) CL (ML) situated centrally between the leading edge line LEL (VKL) 15 and the trailing edge line TEL (HKL) 16. The centerline 17 is spaced from the trailing edge plane and the leading edge plane by half the meridional profile depth Cm each.

According to the present invention, it is favorable to position a boundary layer barrier 11 near the profile suction side SS or also at the periphery RF of the rounding radius normally provided on the blade ends and also termed fillet radius. When arranged upstream of the leading edge line LEL (VKL) 15, proximity to the skeleton line is favorable.

The right-hand side of the figure shows the example according to the present invention of a structural boundary layer barrier 11 situated further downstream in the blade passage. It starts close to the fillet radius, has a different spatial extension, but is angulated relative to the auxiliary lines similarly to the boundary layer barrier in the left-hand part of the figure. Shown here is the inclination angle α formed by the boundary layer barrier at the intersection of its top line (line of maximum elevation, definition further below) relative to an auxiliary line in the plane m-u.

Analogically to FIG. 3a, FIG. 3b shows two examples of arrangements according to the present invention of a blade row 2 with structural boundary layer barrier 11 at the fixed blade end. Also in this figure, the top lines are each shown dotted.

The left-hand half of the figure shows a boundary layer barrier which is provided in the forward part of the blade passage and has a downstream curved course. The local inclination of the boundary layer barrier relative to the auxiliary line direction decreases with increasing distance from the blade suction side.

The right-hand half of FIG. 3b shows a similarly configured boundary layer barrier which, however, is provided upstream of the leading edge plane VKL and in the vicinity of the leading edge/suction side.

Analogically to FIG. 3a, FIG. 3c also shows two examples of arrangements according to the present invention of a blade row with structural boundary layer barrier 11 at the fixed blade end.

The left-hand half of FIG. 3c here shows the combination of two downstream curved boundary layer barriers 11 (denoted as 11a and 11b), one of which being arranged in the forward part of the blade passage. This boundary layer barrier 11b has a peculiar contour illustrated by elevation lines with steep ascent against the flow direction and relatively flat descent in the flow direction. A second boundary layer barrier 11a provided further upstream before the leading edge plane VKL is, in accordance with the present invention, situated particularly favorably close to the skeleton line SL of the blade profile on the suction side and winds around the blade leading edge on the suction side. Also shown in the left-hand half of FIG. 3c is a section K-K which is used in the following figures to define characteristics of the present invention. Section K-K may extend along any auxiliary line HL and always vertically to plane u-m, thereby enabling the form of a boundary layer barrier 11 to be viewed approximately in the main flow direction.

The right-hand half of FIG. 3c shows an arrangement with boundary layer barrier 11 which is provided upstream of and close to the leading edge and winds around the leading edge on both suction and pressure side.

Analogically to FIG. 3a, FIG. 3d also shows two examples of arrangements according to the present invention of a blade row with structural boundary layer barrier 11 at the fixed blade end.

The left-hand half of FIG. 3d here shows a downstream curved boundary layer barrier 11 which is arranged in the forward part of the blade passage directly adjacent to the blade suction side. The local inclination of the boundary layer barrier relative to the auxiliary line direction decreases with increasing distance from the blade suction side, corresponding to a continuous decrease of the inclination angle α which in favorable cases according to the present invention should be in the range $0°<\alpha<120°$.

The right-hand half of FIG. 3d shows a similarly formed boundary layer barrier which, however, is provided directly adjacent to the leading edge. This boundary layer barrier has a peculiar contour illustrated by elevation lines with steep ascent against the flow direction and relatively flat descent in the flow direction.

FIG. 3e again shows further examples of blade row arrangements according to the present invention with a boundary layer barrier 11 on the fixed blade end. However, the boundary layer barriers 11 according to FIGS. 3a to 3d are provided as structural build-up on the sidewall contour, i.e. the boundary layer barrier 11 is a solid body-type element of the blade row assembly and is provided by the shape of the sidewall contour or an extra component attached. Contrarily, FIG. 3e shows boundary layer barriers 11 which are provided by a fluid jet. The fluid jet is injected obliquely or, if applicable, also transversely to the main flow direction and oriented such that it is directed away from the blade suction side and, upon entering the main flow path, extends tangentially to the sidewall contour. Advantageous is an angle between auxiliary line and jet exit direction in the range of 60° to 120°.

The left-hand half of FIG. 3e shows a fluid transverse jet which is delivered in the forward half of the blade passage from a point close to the suction side transversely to the main flow onto the sidewall contour. Injecting such a jet produces a downstream curved boundary layer barrier 11b which, as not illustrated in this figure, can according to the present invention also commence directly at the suction side.

The local inclination of the fluidic boundary layer barrier 11b decreases relative to the auxiliary line direction with increasing distance from the blade suction side. A second, similarly designed boundary layer barrier 11a is here provided upstream of the leading edge plane VKL. In this case, the injection port is situated close to the convexly curved side of the skeleton line and close to the leading edge. Also depicted is a section S-S exemplarily extending here through the fluidic boundary layer barrier provided in the passage. Section S-S is required to further illustrate the characteristics.

The right-hand half of FIG. 3e shows a fluidic boundary layer barrier 11a upstream of the leading edge plane VKL. The injection port is again situated close to the leading edge, but on the concavely curved side of the skeleton line near the pressure side. However, the jet direction is still characterized by a continuous departure from the convexly curved side of an auxiliary line HL. Furthermore, the figure shows, situated on the suction side near the leading edge, a second boundary layer barrier which commences directly on the suction side and is formed by a fluid jet issuing from the suction side transversely to the main flow. In addition, the figure shows, situated in the passage, a third boundary layer barrier 11b which, while being provided partly structural and adjacent to the suction side, is in its further course formed by a fluid transverse jet issuing from the structural part.

FIG. 3f shows a boundary layer barrier according to the present invention which is formed by a series of intermerging fluid transverse jets. The jet exit ports are here exemplified in the area of the leading edge plane, but may have any location in or before the blade passage. If several fluid transverse jets are provided, it is particularly advantageous to stagger the exit ports, or the centers thereof, transversely to the auxiliary line direction, characterized in that two adjacent exit ports are disposed on different auxiliary lines and the further downstream exit port—proceeding from a convex side to a concave side of an auxiliary line—is offset relative to the further upstream exit port.

FIG. 4 shows different cross-sectional shapes of the boundary layer barrier 11 according to the present invention in a section K-K as provided in FIG. 3c. Section K-K always extends along an auxiliary line HL and vertically to plane u-m. The position of section K-K shown in FIG. 3c is for principal illustration. Of course, section K-K can be based on any other auxiliary line HL or a skeleton line SL. FIG. 4 contains 12 different examples of cross-sectional shapes of a boundary layer barrier 11 according to the present invention, namely the figure parts (a) to (l). Of these, the figure parts (a) to (h) apply to structural boundary layer barriers 11, the figure parts (i) to (l) to fluidic boundary layer barriers 11.

Figure part (a) shows a thin, unprofiled, structural barrier 11 with rectangular cross-section which ascends from the sidewall and, as shown here, is integrally provided with the sidewall component or (as not shown here) is attachable as separate component (by joining, welding, brazing, pinning, threadedly connecting etc.). The side of the boundary layer barrier profile facing the main flow is particularly relevant to the present invention, it ascends here approximately vertically from the sidewall surface.

Figure part (b) again shows a thin, structural barrier 11. The cross-section is essentially rectangular and is provided with a rounding on the inflow-facing side to improve flow-over.

Figure part (c) shows a "pointed" structural barrier 11 which ascends steeply from the sidewall. A flat runout of the barrier 11 on the outflow side is advantageous according to the present invention.

Figure part (d) shows a structural barrier 11 which ascends steeply from the sidewall and which on the inflow side is similar to the one shown in figure part (b). Additionally provided here is an aerodynamically more favorable flat runout of the barrier on the outflow side.

Figure part (e) shows an upstream inclined structural barrier 11 which ascends steeply from the sidewall and forms a fillet with the latter. Also in this case an aerodynamically more favorable flat runout of the barrier on the outflow side is provided.

Figure part (f) shows an upstream inclined structural barrier 11 which ascends steeply from the sidewall and forms a strong fillet with the latter, with the inflow side and the outflow side of the barrier jointly forming an upstream directed edge, similar to a toppling ocean wave.

The characteristic of a steep ascent of the barrier on the inflow side and a less steep descent on the outflow side are basically particularly favorable according to the present invention.

Figure part (g) shows, ascending from the sidewall, a structural barrier which has a round cross-section and is joined to the sidewall by welding or brazing.

Figure part (h) shows, ascending from the sidewall, a structural barrier which has a rectangular cross-section and is joined to the sidewall by welding or brazing.

Figure part (i) shows a fluidic boundary layer barrier 11 with an essentially oval cross-section adjoining the sidewall, as produced by fluid injection onto the sidewall surface from an oval port, which can be provided in the sidewall or in the blade surface.

Figure part (j) shows a fluidic boundary layer barrier 11 with an essentially rectangular cross-section adjoining the sidewall, as produced by fluid injection onto the sidewall surface from a rectangular port, which can be provided in the sidewall or in the blade surface.

Figure part (k) shows a fluidic boundary layer barrier 11 with an essentially quadrangular cross-section adjoining the sidewall, as produced by fluid injection onto the sidewall surface from a quadrangular port, which can be provided in the sidewall or in the blade surface. It is advantageous if the quadrangular cross-section narrows towards the sidewall contour, as shown here.

Figure part (l) shows a fluidic boundary layer barrier 11 with an essentially triangular cross-section adjoining the sidewall, as produced by fluid injection onto the sidewall surface from a triangular port, which can be provided in the sidewall or in the blade surface.

It is advantageous if one corner of the triangular cross-section touches the sidewall contour, as shown here.

FIG. 5 shows two perspective representations of a blade row 2 with structural boundary layer barrier 11 according to the present invention. For better visibility of the blade passage, one blade 2 has been removed and only the footprint thereof shown on the sidewall contour by broken lines. The cross-sections of the barrier 11 at the various positions correspond to the provisions of FIG. 4.

The course of the barriers 11, when proceeding towards the opposite blade pressure side, is increasingly less inclined against the direction of the main flow. The course of a boundary layer barrier 11 according to the present invention is measured by means of the top line TL of the barrier 11. The top line TL is established by connecting the points of maximum elevation relative to the sidewall contour. A precise definition of the points of maximum elevation is provided hereinafter in FIG. 6.

The left-hand half of FIG. 5 shows a boundary layer barrier 11 which commences in the vicinity of the suction side in the blade passage, with the barrier 11 being formed by a land-type obstacle which is rounded on top, but is otherwise simple.

The right-hand half of FIG. 5 shows a boundary layer barrier 11 which commences directly on the blade suction side near the leading edge, with the barrier 11 having a variable cross-section along its extension in the blade passage and with a flat outflow-side runout of the barrier 11 being provided in particular at and in the vicinity of the suction side.

FIG. 6 serves the definition of the points of maximum elevation. It shows a boundary layer barrier 11 in a section K-K (erected on an auxiliary line HL and extending correspondingly curved). Marked in the environment of the boundary layer barrier 11 are the points F and R. Extending parallel to the connecting line of the points F and R is a second straight line which is tangent to the point T of the maximum elevation of the boundary layer barrier. In parallel direction to the two straight lines, the distance between F and T measures 0.2 Cm, i.e. 20 percent of the meridional profile depth Cm of the blade profile section (distance between leading edge and trailing edge sidewall point at the blade end provided with barrier, see sketch top right in FIG. 6). The distance between R and T measures 0.5·Cm. Identifying the point of maximum elevation, T, in this manner allows particularly favorable quantities according to the present invention to be defined. Accordingly, the elevation height h is established as distance between the point T and the straight line through F and R. Advantageous according to the present invention are elevation heights of the boundary layer barrier in accordance with h/H<0.2, with H being the distance between the inner and the outer sidewall point on the leading edge.

It should be noted here that one of the points F and R, due to the structural barrier being extremely positioned, may lie outside of the bladed space of the blade row 2 considered, or even fall within the bladed space of an adjacent blade row 2.

Also, one of the points F and R may fall in a zone of non-existent sidewall contour, as given for example by the axial gap between a rotor disk and a stator inner shroud. In such a case, point F or R, respectively, is to be situated on a fictitious, rectilinear bridge of the sidewall axial gap. This said bridging line is to be provided as best possible, smooth completion of the missing sidewall section.

The steepness of the inflow side of the boundary layer barrier 11 is particularly important for high efficiency. In order to quantify this steepness, an auxiliary point E is additionally considered which is situated on the inflow flank of the boundary layer barrier at the distance h/2 from the straight line through F and R. This results in a distance f between the top point T and the auxiliary point E. The quotient h/f is a measure for the steepness of the inflow side. Particularly favorable configurations according to the present invention are obtained with (h/f)>1.

FIG. 7a shows a perspective representation of a blade row 2 with fluidic boundary layer barrier 11 according to the present invention. For better visibility of the blade passage, one blade has been removed and only the footprint thereof shown on the sidewall contour by broken lines. Exemplified here are two boundary layer barriers 11 generated by a fluid transverse jet. The course of the barriers, when proceeding towards the opposite blade pressure side, is increasingly less inclined against the direction of the main flow (corresponding to the shape of a horseshoe). In the vicinity of the leading edge, the boundary layer barrier 11 is formed by a fluid transverse jet injected through an oval port. Further downstream in the blade passage, the boundary layer barrier 11 is formed by a fluid transverse jet injected through a rectangular port.

FIG. 7b shows two examples according to the present invention of a boundary layer barrier 11 generated by a fluid transverse jet in section S-S defined in the left-hand half of FIG. 3e. Shown in each example are the main flow path confinement (sidewall) and a blade profile adjoining thereon in the area of the jet injection point.

In the left-hand half of FIG. 7b, the exit port of the fluid transverse jet is provided in the area of a recess in the sidewall contour.

In the right-hand half of the figure, the exit port of the fluid transverse jet is provided in a step-free sidewall contour.

In both examples, the fluid transverse jet is supplied at a shallow angle to the sidewall contour, with the objective that the jet, upon entering the main flow, develops tangentially along the sidewall. The fluid is supplied from the sidewall.

FIG. 7c shows two further examples of a boundary layer barrier generated by a fluid transverse jet in section S-S according to the present invention.

In the left-hand half of FIG. 7c, the exit port of the fluid transverse jet is provided in the blade suction side immediately at the sidewall. Accordingly, the fluid issues transversely to the main flow tangentially to the sidewall contour. The fluid is supplied from a cavity in the blade.

In the right-hand half of FIG. 7c, the exit port of the fluid transverse jet is provided in a short structural boundary layer barrier 11 adjoining the blade suction side, and here again immediately at the sidewall, to generate a tangential transverse jet.

The fluid is here supplied from a cavity in the sidewall of the exit port. For all variants of a fluidic boundary layer barrier 11 according to the present invention, it is advantageous if the initial height w of the fluid jet is in the range 0<w/H<0.2.

The present invention provides for a significantly higher aerodynamic loadability of rotors and stators in fluid flow machines, with efficiency being maintained or even improved. A reduction of the number of parts and the weight of the components by more than 20 percent seems to be achievable.

The present invention can also be described as follows:

Fluid flow machine with a main flow path in which at least one row of blades is arranged, with at least one blade end of a blade row being firmly connected to the main flow path confinement and, in the area of this fixed blade end at the sidewall, at least one longish, obstacle-type elevation, referred to as boundary layer barrier being provided which in at least part of its course is oriented obliquely to the main flow direction, thereby deflecting fluid flowing near the sidewall towards the blade pressure side, wherein it is preferably provided that:

a.) a skeleton line is allocated to each blade profile section on the sidewall of the fixed blade end provided with the at least one boundary layer barrier, with the skeleton line being defined within the profile by the centerline between the pressure and the suction side and outside of the profile by the respective tangential continuation of this centerline on the leading and trailing edges, b.) a family of auxiliary lines is given in the area between the skeleton lines of two adjacent sidewall profile sections along the sidewall, with each auxiliary line being generated by merely shifting the sidewall profile skeleton line in the circumferential direction u, and with the course of an auxiliary line at any point in the area of said fixed blade end characterising the course of the main flow, c.) the at least one boundary layer barrier has a starting point from which it extends with a direction component which is transverse relative to the auxiliary lines, so that the boundary layer barrier intersects the family of auxiliary lines in such a manner that, commencing at the starting point, the course of the boundary layer barrier continuously departs from the convex side of an auxiliary line and approaches the concave side of an adjacent auxiliary line, and d.) the course of each boundary layer barrier is measured by means of its top line, i.e. the connecting line of the points of maximum elevation of the boundary layer barrier, with preferably at least one boundary layer barrier being provided in at least one partial section as solid body-type element of the blade row assembly which is structurally connected to the sidewall, with preferably at least one boundary layer barrier being provided in at least one partial section as at least one fluid jet which touches the sidewall, with preferably the starting point of at least one boundary layer barrier being provided in the environment of the profile section formed by the blade leading edge and the blade suction side, with preferably at least one boundary layer barrier directly adjoining the blade in the contour area formed by the blade leading edge and the blade suction side, with preferably the starting point of the boundary layer barrier being provided upstream of the trailing edge plane of the blade, with preferably the starting point of the boundary layer barrier being provided upstream of the plane located centrally between the blade leading edge and the blade trailing edge and, thus, in the forward half of the blade passage, with preferably the starting point of the boundary layer barrier being provided in the area of +/−15% of the meridional profile depth Cm around the leading edge plane, with preferably, commencing at the starting point of the boundary layer barrier, the inclination angle $\alpha$ included by the top line and an auxiliary line continuously decreasing along the course of the boundary layer barrier and lying in the range $0° < \alpha < 120°$, with preferably the boundary layer barrier, corresponding to the shape of a horseshoe, winding around the blade leading edge, with preferably the boundary layer barrier entirely being formed by at least one fluid jet injected into the main flow from a port in one of the sidewall or blade surfaces, with the geometry of the port and the orientation of the supply duct issuing into the port being provided such that a course of the issuing fluid jet tangential to the sidewall surface is attained, with preferably the boundary layer barrier being provided by several, seriate fluid transverse jets and the centers of the individual jet exit ports being staggered transversely to the auxiliary line direction in such a manner that the centers of two adjacent exit ports are disposed on different auxiliary lines and a further downstream exit port center—proceeding from a convex side to a concave side of an auxiliary line—is offset relative to a further upstream exit port center, with preferably the inclination angle $\alpha$ between the auxiliary line at the port and the jet exit direction ranging between 60° and 120°, with preferably the cross-sectional contour of the boundary layer barrier on the inflow-facing side ascending steeply from the sidewall in at least one plane K which is given by the intersection of a plane vertical to the plane established by meridional direction m and circumferential direction u and based on an auxiliary line with the boundary layer barrier, with preferably the cross-sectional contour of the boundary layer barrier on the inflow-facing side in at least one plane K essentially vertically detaching from the sidewall, with preferably the cross-sectional contour of the boundary layer barrier on the inflow-facing side forming a fillet in at least one plane K, with preferably the cross-sectional contour of the boundary layer barrier on the side facing away from the inflow flatly extending in at least one plane K, with preferably the elevation height h of the cross-sectional contour of the boundary layer barrier not exceeding a dimension of 0.2 H in at least one plane K, with H being the distance between the inner and the outer sidewall point on the leading edge, with preferably the boundary layer barrier being at least partly formed by a fluid jet, and the cross section of the port issuing the fluid jet being formed such that the jet carries less fluid in its part injected in immediate vicinity of the sidewall contour as a result of the locally small port cross-section there, and more fluid in its part injected further remote from the sidewall, as a result of the locally large port cross-section there, so that the fluid mass within the jet increases with the distance from the sidewall, with this being attainable in the extreme case by an essentially triangular jet exit port.

LIST OF REFERENCE NUMERALS

1 Casing
2 Blade row/blade/blade profile
3 Hub
4 Machine axis
5 Blade leading edge LE (VK)
6 Blade trailing edge TE (HK)
7 Suction side SS
8 Pressure side PS (DS)
9 Main flow path confinement at fixed blade end
10 Running gap
11 Sidewall boundary layer barrier/barrier
12 Cavity
13 Sealing fin
14 Shroud 15 Leading edge line LEL (VKL)
16 Trailing edge line TEL (HKL)
17 Centerline CL (ML)

What is claimed is:

1. A fluid flow machine, comprising:
a main flow path;
a main flow path confinement confining the main flow path;
at least one row of blades arranged in the main flow path, with at least one blade end of the blade row fixed to the main flow path confinement, and;
at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:
a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges,
b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow,
c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and
d) the course of each boundary layer barrier is defined by a top line, which is formed by a connecting line of points of maximum elevation of the boundary layer barrier;
wherein the at least one boundary layer barrier is provided in at least one partial section as at least one fluid jet;
wherein the at least one fluid jet is directed away from a suction side of the fixed blade end toward the pressure side of the adjacent blade.

2. The fluid flow machine of claim 1, where the at least one fluid jet touches the sidewall.

3. The fluid flow machine of claim 1, wherein a starting point of the at least one boundary layer barrier is provided in an environment of a profile section formed by the blade leading edge and the blade suction side.

4. The fluid flow machine of claim 3, wherein the at least one boundary layer barrier directly adjoins the blade in a contour area formed by the blade leading edge and the blade suction side.

5. The fluid flow machine of claim 1, wherein the starting point of the at least one boundary layer barrier is provided upstream of the trailing edge plane of the blade.

6. The fluid flow machine of claim 5, wherein the starting point of the at least one boundary layer barrier is provided upstream of a plane located centrally between the blade leading edge and the blade trailing edge and, thus, in a forward half of the blade passage.

7. The fluid flow machine of claim 6, wherein the starting point of the at least one boundary layer barrier is provided in an area of +/−15% of a meridional profile depth Cm from a leading edge plane of the blade.

8. The fluid flow machine of claim 1, wherein, commencing at the starting point of the at least one boundary layer barrier, an inclination angle $\alpha$ included by the top line and an auxiliary line continuously decreases along the course of the at least one boundary layer barrier and lies in a range $0°<\alpha<120°$.

9. The fluid flow machine of claim 1, wherein the at least one boundary layer barrier, having a shape of a horseshoe, winds around the blade leading edge.

10. The fluid flow machine of claim 1, wherein the at least one boundary layer barrier is entirely formed by at least one fluid jet injected into the main flow from a port in at least one of a sidewall and blade surfaces, with a geometry of the port and an orientation of a supply duct issuing into the port provided such that a course of the issuing at least one fluid jet is tangential to the sidewall surface.

11. The fluid flow machine of claim 1, wherein the at least one boundary layer barrier is provided by a plurality of sedate fluid transverse jets and centers of individual jet exit ports are staggered transversely to an auxiliary line direction such that the centers of two adjacent exit ports are disposed on different auxiliary lines and a further downstream exit port center, proceeding from a convex side to a concave side of an auxiliary line, is offset relative to a further upstream exit port center.

12. The fluid flow machine of claim 11, wherein an inclination angle $\alpha$ between the auxiliary line at each port and the jet exit direction at each port ranges between 60° and 120°.

13. The fluid flow machine of claim 1, wherein a cross-sectional contour of the at least one boundary layer barrier on an inflow-facing side ascends steeply from a sidewall in at least one plane K which is given by an intersection of a plane vertical to a plane established by a meridional direction m and a circumferential direction u and based on an auxiliary line with the at least one boundary layer barrier.

14. The fluid flow machine of claim 13, wherein a cross-sectional contour of the at least one boundary layer barrier on an inflow-facing side in at least one plane K essentially vertically detaches from the sidewall.

15. The fluid flow machine of claim 13, wherein a cross-sectional contour of the at least one boundary layer barrier on an inflow-facing side forms a fillet in at least one plane K.

16. The fluid flow machine of claim 15, wherein the cross-sectional contour of the at least one boundary layer barrier on a side facing away from the inflow flatly extends in at least one plane K.

17. The fluid flow machine of claim 1, wherein an elevation height h of a cross-sectional contour of the at least one boundary layer barrier is less than a dimension of 0.2 H in at least one plane K, with H being a distance between an inner and an outer sidewall point on the leading edge.

18. The fluid flow machine of claim 1, wherein the at least one boundary layer barrier is at least partly formed by at least one fluid jet, and a cross section of at least one port issuing the at least one fluid jet is formed such that the at least one fluid jet carries less fluid injected in an immediate vicinity of a sidewall contour as a result of a locally small port cross-section there, and more fluid injected further remote from the sidewall contour, as a result of a locally large port cross-section there, so that a fluid mass within the at least one fluid jet increases with a distance from the sidewall.

19. The fluid flow machine of claim 1, wherein the at least one boundary layer barrier is at least partly formed by at least one fluid jet, and a cross section of at least one port issuing the at least one fluid jet is formed such that the at least one fluid jet carries more fluid injected in an immediate vicinity of a sidewall contour as a result of a locally large port cross-section there, and less fluid injected further remote from the sidewall contour, as a result of a locally small port cross-section there, so that a fluid mass within the at least one fluid jet decreases with a distance from the sidewall.

20. The fluid flow machine of claim 1, where the at least one fluid jet directed away from a suction side of the fixed blade end toward the pressure side of the adjacent blade has a circumferential component of direction.

21. A fluid flow machine, comprising:
a main flow path;
a main flow path confinement confining the main flow path;
at least one row of blades arranged in a portion of the main flow path in which energy is imparted to a fluid flow, with at least one blade end of the blade row fixed to the main flow path confinement, and;
at least one longish, obstacle-type boundary layer barrier being provided in an area of the fixed blade end at a sidewall, which in at least part of its course, is oriented obliquely to a main flow direction, thereby deflecting fluid flowing near the sidewall towards a blade pressure side, wherein it is provided that:
a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges,
b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow,
c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and
d) the course of each boundary layer barrier is defined by a top line, which is formed by a connecting line of points of maximum elevation of the boundary layer barrier;
wherein the at least one boundary layer barrier is provided in at least one partial section as a solid body-type element of the blade row assembly which is structurally connected to the sidewall;
wherein the starting point of the at least one boundary layer barrier is provided in an area of +/−15% of a meridional profile depth Cm from a leading edge plane of the blade.

22. The fluid flow machine of claim 21, wherein a starting point of the at least one boundary layer barrier is provided in an environment of a profile section formed by the blade leading edge and the blade suction side.

23. The fluid flow machine of claim 22, wherein the at least one boundary layer barrier directly adjoins the blade in a contour area formed by the blade leading edge and the blade suction side.

24. The fluid flow machine of claim 21, wherein, commencing at the starting point of the at least one boundary layer barrier, an inclination angle α included by the top line and an auxiliary line continuously decreases along the course of the at least one boundary layer barrier and lies in a range $0°<\alpha<120°$.

25. The fluid flow machine of claim 21, wherein the at least one boundary layer barrier, having a shape of a horseshoe, winds around the blade leading edge.

26. The fluid flow machine of claim 21, wherein a cross-sectional contour of the at least one boundary layer barrier on an inflow-facing side ascends steeply from a sidewall in at least one plane K which is given by an intersection of a plane vertical to a plane established by a meridional direction m and a circumferential direction u and based on an auxiliary line with the at least one boundary layer barrier.

27. The fluid flow machine of claim 26, wherein a cross-sectional contour of the at least one boundary layer barrier on an inflow-facing side in at least one plane K essentially vertically detaches from the sidewall.

28. The fluid flow machine of claim 26, wherein a cross-sectional contour of the at least one boundary layer barrier on an inflow-facing side forms a fillet in at least one plane K.

29. The fluid flow machine of claim 28, wherein the cross-sectional contour of the at least one boundary layer barrier on a side facing away from the inflow flatly extends in at least one plane K.

30. The fluid flow machine of claim 21, wherein an elevation height h of a cross-sectional contour of the at least one boundary layer barrier is less than a dimension of 0.2 H in at least one plane K, with H being a distance between an inner and an outer sidewall point on the leading edge.

31. A fluid flow machine, comprising:
a main flow path;
a main flow path confinement confining the main flow path;
at least one row of blades arranged in the main flow path, with at least one blade end of the blade row fixed to the main flow path confinement, and;
at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:
a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges,
b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow,
c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and
d) the course of each boundary layer barrier is defined by a top line, which is formed by a connecting line of points of maximum elevation of the boundary layer barrier;

wherein a starting point of the at least one boundary layer barrier is provided in an environment of a profile section formed by the blade leading edge and the blade suction side;

wherein the at least one boundary layer barrier directly adjoins the blade in a contour area formed by the blade leading edge and the blade suction side.

32. A fluid flow machine, comprising:

a main flow path;

a main flow path confinement confining the main flow path;

at least one row of blades arranged in the main flow path, with at least one blade end of the blade row fixed to the main flow path confinement, and;

at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:

a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges, b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow, c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and d) the course of each boundary layer barrier is defined by a top line, which is formed by a connecting line of points of maximum elevation of the boundary layer barrier;

wherein, commencing at the starting point of the at least one boundary layer barrier, an inclination angle $\alpha$ included by the top line and an auxiliary line continuously decreases along the course of the at least one boundary layer barrier and lies in a range $0°<\alpha<120°$.

33. The fluid flow machine of claim 32, wherein the at least one boundary layer barrier is provided in at least one partial section as a solid body-type element of the blade row assembly which is structurally connected to the sidewall.

34. A fluid flow machine, comprising:

a main flow path;

a main flow path confinement confining the main flow path;

at least one row of blades arranged in the main flow path, with at least one blade end of the blade row fixed to the main flow path confinement, and;

at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:

a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges, b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow, c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and d) the course of each boundary layer barrier is defined by a top line, which is formed by a connecting line of points of maximum elevation of the boundary layer barrier;

wherein the at least one boundary layer barrier, having a shape of a horseshoe, winds around the blade leading edge.

35. A fluid flow machine, comprising:

a main flow path;

a main flow path confinement confining the main flow path;

at least one row of blades arranged in the main flow path, with at least one blade end of the blade row fixed to the main flow path confinement, and;

at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:

a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges, b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow, c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and d) the course of each boundary layer barrier is defined by a top line, which is formed by a connecting line of points of maximum elevation of the boundary layer barrier;

wherein a cross-sectional contour of the at least one boundary layer barrier on an inflow-facing side ascends steeply from a sidewall in at least one plane K which is given by an intersection of a plane vertical to a plane established by a meridional direction m and a circumferential direction u and based on an auxiliary line with the at least one boundary layer barrier.

36. The fluid flow machine of claim 35, wherein a cross-sectional contour of the at least one boundary layer barrier on an inflow-facing side in at least one plane K essentially vertically detaches from the sidewall.

37. The fluid flow machine of claim 35, wherein a cross-sectional contour of the at least one boundary layer barrier on an inflow-facing side forms a fillet in at least one plane K.

38. The fluid flow machine of claim 37, wherein the cross-sectional contour of the at least one boundary layer barrier on a side facing away from the inflow flatly extends in at least one plane K.

39. A fluid flow machine, comprising:
a main flow path;
a main flow path confinement confining the main flow path;
at least one row of blades arranged in the main flow path, with at least one blade end of the blade row fixed to the main flow path confinement, and;
at least one longish, obstacle-type boundary layer barrier being provided in an area of the fixed blade end at a sidewall, which in at least part of its course, is oriented obliquely to a main flow direction, thereby deflecting fluid flowing near the sidewall toward a pressure side of an adjacent blade, wherein it is provided that:
a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges,
b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow,
c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and
d) the course of each boundary layer barrier is defined by a top line, which is formed by a connecting line of points of maximum elevation of the boundary layer barrier;
wherein the at least one boundary layer barrier is at least partly formed by at least one fluid jet, and a cross section of at least one port issuing the at least one fluid jet is formed such that the at least one fluid jet carries more fluid injected in an immediate vicinity of a sidewall contour as a result of a locally large port cross-section there, and less fluid injected further remote from the sidewall contour, as a result of a locally small port cross-section there, so that a fluid mass within the at least one fluid jet decreases with a distance from the sidewall.

40. A fluid flow machine, comprising:
a main flow path;
a main flow path confinement confining the main flow path;
at least one row of blades arranged in a portion of the main flow path in which energy is imparted to a fluid flow, with at least one blade end of the blade row fixed to the main flow path confinement, and;
at least one longish, obstacle-type boundary layer barrier being provided in an area of the fixed blade end at a sidewall, which in at least part of its course, is oriented obliquely to a main flow direction, thereby deflecting fluid flowing near the sidewall towards a blade pressure side, wherein it is provided that:
a) a skeleton line is allocated to each blade profile section on a sidewall of the fixed blade end provided with the at least one boundary layer barrier, with the skeleton line being defined within the profile by a centerline between a pressure and a suction side and outside of the profile by a respective tangential continuation of this centerline on leading and trailing edges,
b) a family of auxiliary lines is given in an area between the skeleton lines of two adjacent sidewall profile sections along the sidewall, with each auxiliary line being generated by shifting the sidewall profile skeleton line in a circumferential direction u, and with a course of an auxiliary line at any point in the area of said fixed blade end representative of a course of the main flow,
c) the at least one boundary layer barrier has a starting point from which it extends with a direction component which is transverse relative to the auxiliary lines, so that the boundary layer barrier intersects the family of auxiliary lines in such a manner that, commencing at the starting point, a course of the boundary layer barrier continuously departs from a convex side of an auxiliary line and approaches a concave side of an adjacent auxiliary line, and
d) the course of each boundary layer barrier is defined by a top line, which is formed by a connecting line of points of maximum elevation of the boundary layer barrier;
wherein the at least one boundary layer barrier is provided in at least one partial section as a solid body-type element of the blade row assembly which is structurally connected to the sidewall;
wherein the starting point of the at least one boundary layer barrier is provided upstream from a leading edge plane of the blade.

* * * * *